United States Patent
Richardt et al.

(10) Patent No.: US 9,398,215 B2
(45) Date of Patent: Jul. 19, 2016

(54) STEREOSCOPIC PANORAMAS

(71) Applicant: Disney Enterprises, Inc., Burbank, CA (US)

(72) Inventors: Christian Richardt, Antibes (FR); Henning Zimmer, Zurich (CH); Yael Pritch, Zurich (CH); Alexander Sorkine Hornung, Zurich (CH)

(73) Assignees: ETH ZURICH, Zurich (CH); DISNEY ENTERPRISES, INC., Burbank, CA (US)

( * ) Notice: Subject to any disclaimer, the term of this patent is extended or adjusted under 35 U.S.C. 154(b) by 150 days.

(21) Appl. No.: 14/034,543

(22) Filed: Sep. 23, 2013

(65) Prior Publication Data

US 2014/0307045 A1    Oct. 16, 2014

Related U.S. Application Data

(60) Provisional application No. 61/812,561, filed on Apr. 16, 2013.

(51) Int. Cl.
  *G09G 5/00* (2006.01)
  *H04N 5/232* (2006.01)
  *H04N 13/00* (2006.01)
  *G06T 3/40* (2006.01)

(52) U.S. Cl.
  CPC .......... *H04N 5/23238* (2013.01); *G06T 3/4038* (2013.01); *H04N 13/0011* (2013.01)

(58) Field of Classification Search
  CPC ................. H04N 5/23238; H04N 2013/0088; H04N 13/0003; H04N 13/0007; H04N 13/0011; H04N 13/0275; H04N 13/0055; G06T 2207/10012; G06T 7/0075; G06T 15/20
  See application file for complete search history.

(56) References Cited

U.S. PATENT DOCUMENTS

| | | | |
|---|---|---|---|
| 6,639,596 B1 * | 10/2003 | Shum et al. | 345/427 |
| 6,665,003 B1 | 12/2003 | Peleg et al. | 348/36 |
| 6,795,109 B2 | 9/2004 | Peleg et al. | 348/36 |
| 2003/0035592 A1 | 2/2003 | Cornog et al. | 382/284 |
| 2012/0019614 A1 * | 1/2012 | Murray et al. | 348/36 |

(Continued)

FOREIGN PATENT DOCUMENTS

WO    WO 98/34195    8/1998

OTHER PUBLICATIONS

Rousso et al., "Universal Mosaicing using Pipe Projection", Jan. 1998, IEEE Xplore.*

(Continued)

*Primary Examiner* — Hau Nguyen
(74) *Attorney, Agent, or Firm* — Sheppard Mullin Richter & Hampton LLP

(57) ABSTRACT

Systems and methods to generate stereoscopic panoramas obtain images based on captured images. The obtained images may be processed and/or preprocessed, for example to compensate for perspective distortion caused by the non-ideal camera orientation during capturing, to reduce vertical parallax, to align adjacent images, and/or to reduce rotational and/or positional drift between adjacent images. The obtained images may be used for interpolating virtual in-between images on the fly to reduce visible artifacts in the resulting panorama. Obtained and/or interpolated images (or image fragments) may be stitched together to form a stereoscopic panorama.

14 Claims, 49 Drawing Sheets

(56) References Cited

U.S. PATENT DOCUMENTS

2012/0249730 A1* 10/2012 Lee .................... G06T 7/0075
                                                          348/38
2013/0076856 A1* 3/2013 Wakabayashi .................. 348/36

OTHER PUBLICATIONS

Weersinghe et al., "Stereoscopic Panoramic Video Generation using Centro-Circular Projection Technique", IEEE International Conference, Apr. 2003.*
Peleg et al., "Omnistereo: Panoramic Stereo Imaging", *IEEE Transactions on Pattern Analysis and Machine Intelligence*, vol. 23, No. 3, IEEE Computer Society, USA, Mar. 1, 2001, pp. 279-290, XP001005773.
Shum et al., "Systems and Experiment Paper: Construction of Panoramic Image Mosaics with Global and Local Alignment", *International Journal of Computer Vision*, vol. 36, No. 2, Kluwer Academic Publishers, Norwell, USA, Jan. 1, 2000, pp. 101-130, XP002578824.
Sawhney et al., "True Multi-Image Alignment and Its Application to Mosaicing and Lens Distortion Correction", *Proceedings of the 1997 IEEE Computer Society Conference on Computer Vision and Pattern Recognition*, San Juan, Puerto Rico, Jun. 17-19, 1997, pp. 450-456, XP000776535.
Li et al., "Stereo Reconstruction from Multiperspective Panoramas", *IEEE Transactions on Pattern Analysis and Machine Intelligence*, vol. 26, No. 1, IEEE Computer society, USA, Jan. 1, 2004, pp. 45-62, XP001185855.
Huang, Ho-Chao, et al., "Panoramic Stereo Imaging System with Automatic Disparity Warping and Seaming", CVGIP Graphical Models and Image Processing, Academic Press, vol. 60, No. 3, May 1, 1998, XP000752681, pp. 196-208.
Shum, Heung-Yeung, et al., "Stereo Reconstruction from Multiperspective Panoramas", The Proceedings of the Seventh IEEE International Conference on Computer Vision, 1999, vol. 1, Sep. 20, 1999, XP010350473, pp. 14-21.

* cited by examiner

| Dataset | rotational drift | | vertical drift | |
|---|---|---|---|---|
| | IB | Ours | IB | Ours |
| rooftop | 98.7° | 0.0043° | 1.57° | 0.0002° |
| street | 82.7° | 0.0154° | 3.07° | 0.0113° |
| mountain | 66.8° | 0.0600° | 6.26° | 0.0100° |

FIG. 7

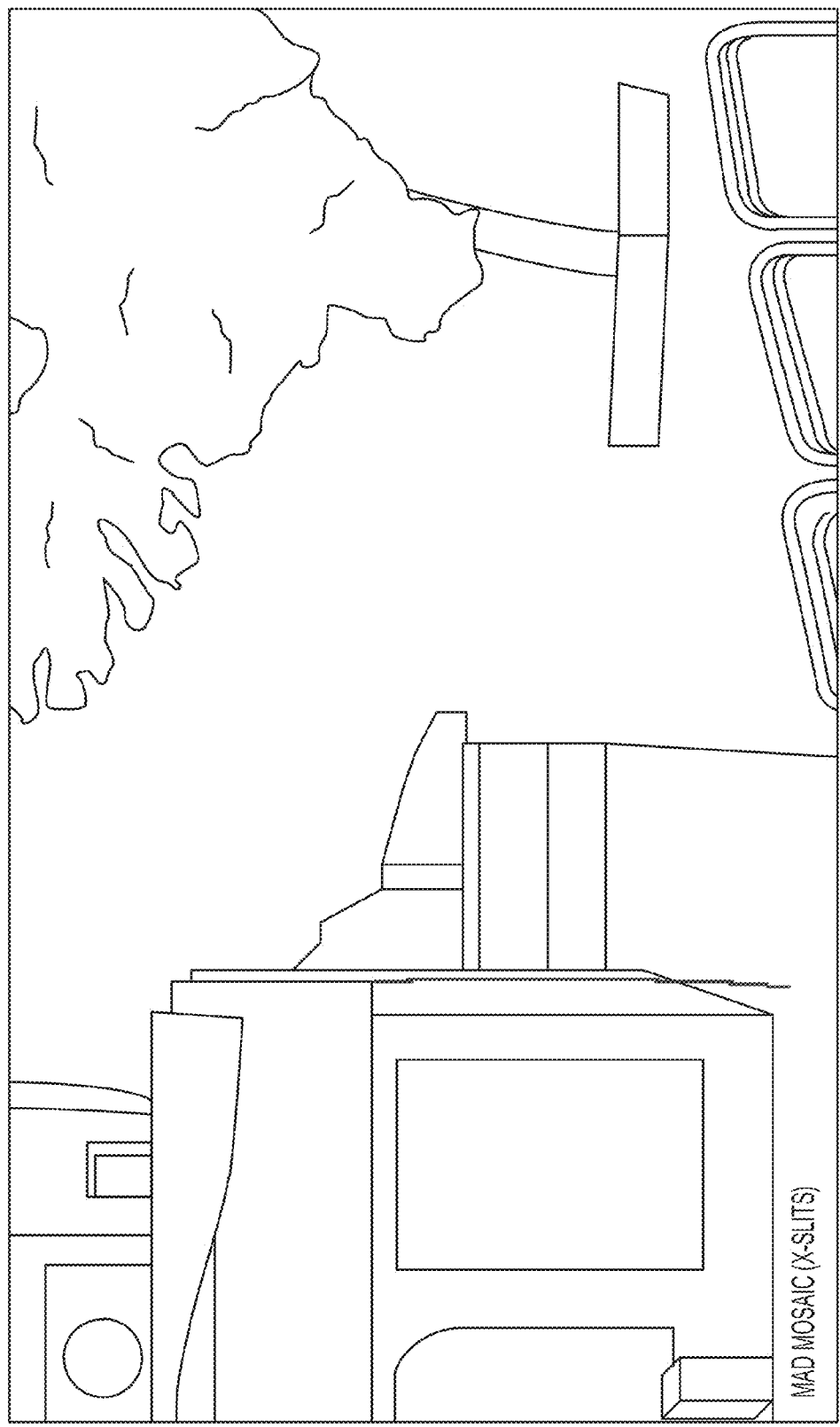

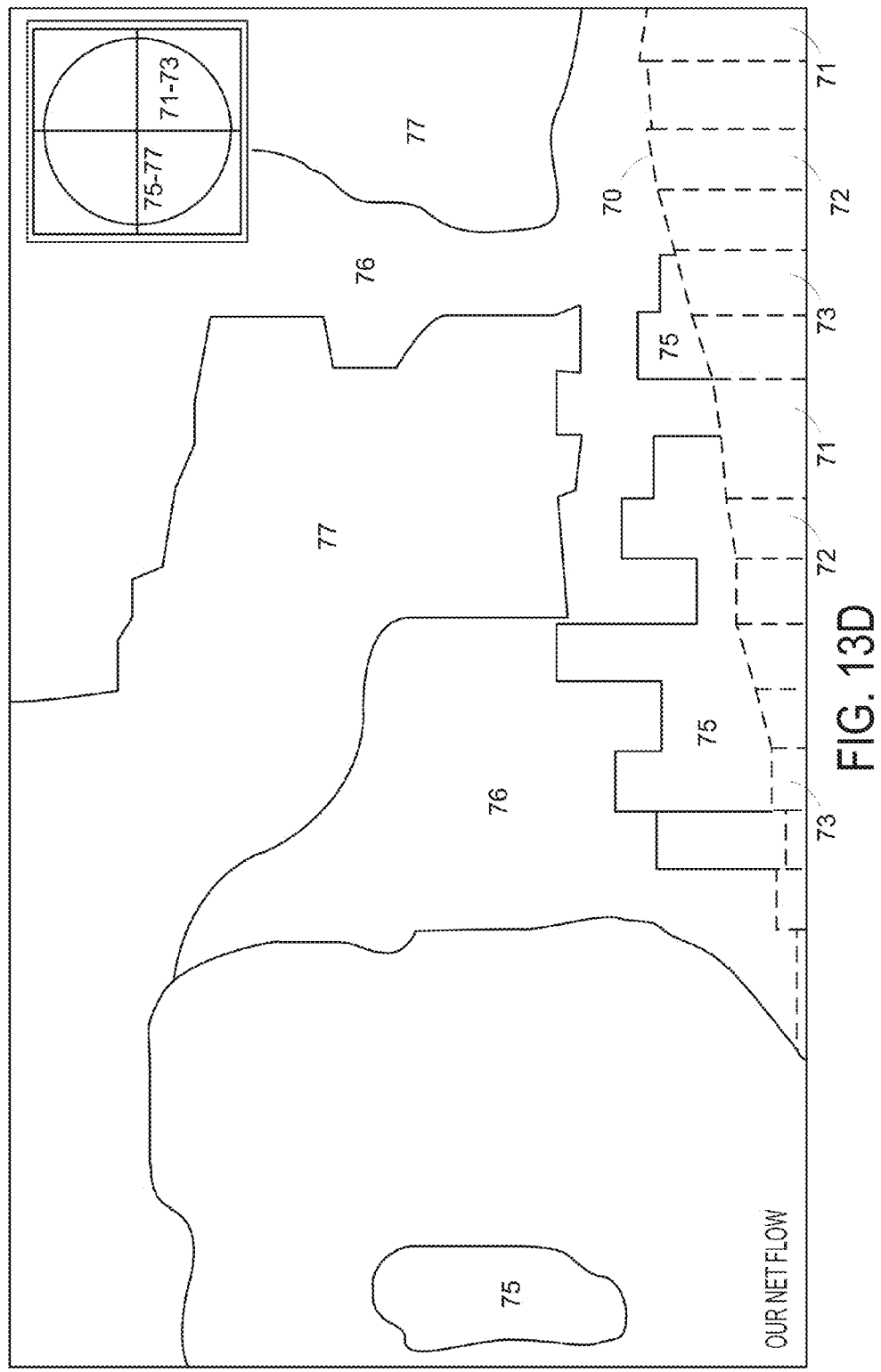

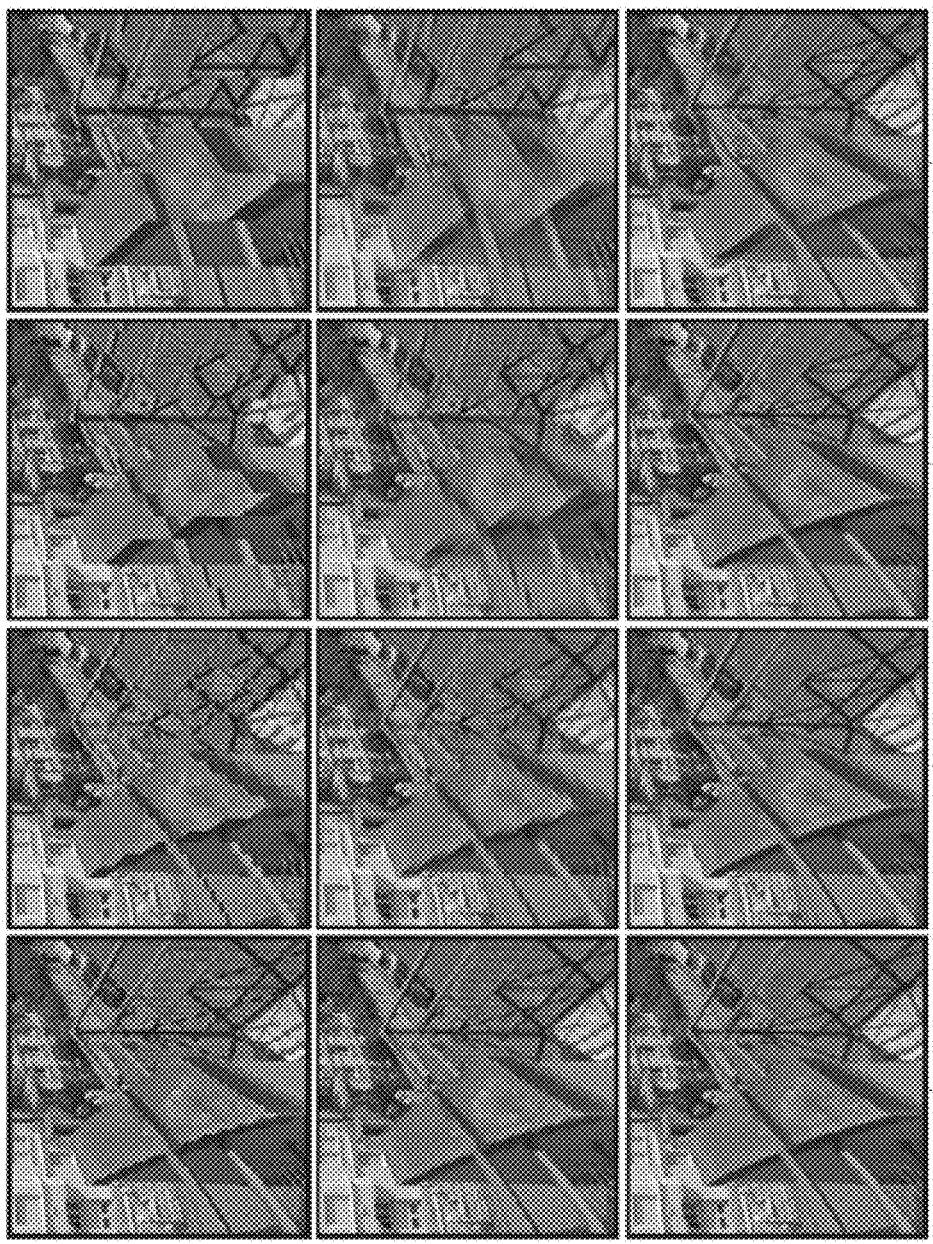

STEREOSCOPIC PANORAMAS

CROSS-REFERENCE TO RELATED APPLICATIONS

The present Application claims priority of U.S. Provisional Patent Application No. 61/812,561, filed Apr. 16, 2013, entitled "Stereoscopic Panoramas," which is expressly incorporated by reference herein.

FIELD OF THE DISCLOSURE

The present invention relates generally to generating panoramas, in particular stereoscopic panoramas, from (digitally and electronically) captured images.

BACKGROUND

Conventionally, obtaining artifact-free (or artifact-reduced), seamless panoramas requires stitching together densely (angular) sampled and/or captured images, e.g. significantly more than one image per degree. At high-definition resolutions, capturing thousands of images may be impractical and/or (computationally) costly.

SUMMARY

One aspect of the disclosure relates to a system configured to generate stereoscopic panoramas. One aspect of the disclosure relates to a method for generating stereoscopic panoramas. The system may include one or more cameras, a support structure, electronic storage, one or more processors configured to execute computer program components, and/or other components. The computer program components may include an image component, an up-sampling component, a stitching component, a distortion component, an orientation component, a vertical parallax component, an alignment component, and/or other components. As used herein, the term camera may be interpreted as any sensor, image sensor, still photography camera, video camera, and/or other image-producing device. The order of the operations of the computer program components is not intended to be limited by examples and embodiments described in this disclosure. Any order is contemplated within the scope of this disclosure.

The system may be configured to reduce image distortion and/or visual artifacts. The system may be configured to interpolate and/or synthesize images (or image portions/fragments) between captured images, in particular adjacent captured images. By virtue of such images, the angular density of the images available for stitching is increased. To accomplish image interpolation and/or synthesis, the optical flow between neighboring and/or adjacent pairs of images may need to be computed and/or determined. For the first image of such a pair, the optical flow is defined as a vector field where an individual pixel has an associated vector that points to the corresponding location of the individual pixel in the second image. Interpolation of in-between images may be accomplished by shifting pixels in the first and/or second image by a certain fraction of the flow vectors, and/or aggregating the shifted pixels to form an interpolated image.

Pre-computing a large number of in-between images that would be needed for artifact-free stitching may be impractical due to prohibitively large memory consumption. As used herein, the term "artifact-free" may be interpreted as "a reduction of artifacts that visually and/or visibly improves the result." By pre-computing and/or storing individual flow fields, interpolation and/or synthesis may be limited to (e.g. merely require) the pixels that are actually needed and/or used in the resulting image during panorama generation. In some implementations, the system may be configured to interactively generate a stereoscopic panorama having a variable interaxial camera distance or baseline, and/or an adjustable vergence point. In some implementations, users may modify the viewpoint (and/or other characteristics of the panorama) and/or navigate within the panorama interactively. As used herein, the term "interactively" may be interpreted as a real-time response to user input. For example, users may be able to zoom in to reveal more details or more features of a panorama.

The image component may be configured to obtain captured images and/or images based on captured images. The captured images may include digital and/or electronic images. Captured images may be processed and/or pre-processed prior to obtainment by the image component. Some or all of the captured images may form a set of adjacent and/or neighboring images. For example, the set may form a sequence. For example, adjacent images may partially overlap and/or include one or more of the same objects, though viewed and/or sampled from fields of view having a sufficient degree of overlap, and/or slightly different viewpoints and/or angles. As used herein, the term "adjacent" may be interpreted in a temporal and/or spatial sense. The term "adjacent" may be used interchangeably with the term "neighboring." In some implementations, a set of images may be captured using a circular camera trajectory. In some implementations, a set of images may be captured by a set of cameras, e.g. an array of cameras, which may capture images sequentially and/or simultaneously.

The up-sampling component may be configured to determine interpolated images between adjacent images. In some implementations, the up-sampling component may be configured to determine interpolated image-fragments, image-portions, and/or image-strips between adjacent images. In some implementations, the up-sampling component may be configured to determine flow fields (and/or flow vectors) between related pixels in adjacent images. Flow fields may be used to compensate for transformations that images have undergone and/or process images that have undergone transformations, including but not limited to a transformation of the pixel grid of an obtained image.

The stitching component may be configured to determine a stereoscopic panorama based on obtained images and interpolated images. The stitching component may be configured to blend pixels and/or image-strips from multiple images. Blending may be based on flow fields as determined by the up-sampling component.

The distortion component may be configured to determine images by compensating for distortion, including, but not limited to, perspective distortion. By way of non-limiting example, the shape of the lens of the camera used to capture an image may cause perspective distortion.

The orientation component may be configured to determine images by compensating for a non-ideal capture setup. An ideal capture setup may include, by way of non-limiting example, a circular camera trajectory, a parallel principal (camera) axis, a viewing-direction that is perpendicular to the camera trajectory, and/or other capture conditions. In some implementations, the orientation component may be configured to compensate for one or both of a non-circular camera trajectory during image capture and/or a non-parallel principal axis during image capture.

The vertical parallax component may be configured to determine images by re-projecting images onto a cylindrical surface and/or reducing vertical parallax.

The alignment component may be configured to determine images by projecting images into a planar and/or two-dimensional surface. The alignment component may be configured to reduce rotational and/or positional drift between adjacent images. Operation of the alignment component may be based on structure-from-motion algorithms. Structure-from-motion algorithms may be used to estimate the three-dimensional position, location, and/or movement of the camera. In some implementations, structure-from-motion algorithms may use global bundle adjustment.

The system may include electronic storage. The electronic storage may comprise non-transitory storage media that electronically stores information. The electronic storage may be configured to store captured images, obtained images, pre-processed images, processed images, etc.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates examples or artifacts in captured images and the step-wise reduction of such artifacts. FIGS. 3A-3L illustrate captured images that are in turn processed to accomplish lens undistortion, orientation stabilization, and parallax compensation in accordance with one or more implementations.

FIG. 7 illustrates a table comparing rotational and vertical drift for different approaches.

FIGS. 13, 13A-13D illustrate examples having thin vertical structures under different approaches.

FIG. 14, 14A-14D illustrate examples of flow-based blending using under-sampled input under different approaches.

FIG. 15, 15A-15D illustrate examples of circular and linear panoramas in accordance with one or more implementations.

DETAILED DESCRIPTION

Many of the figures illustrate one or more different types of visual artifacts that may result from different approaches and/or procedures to the generation of stereoscopic panoramas. The visual artifacts in any particular figure are not limited to the described artifacts, but may include additional artifacts as may be apparent to knowledgeable practitioners in relevant fields of technology. Some of the figures include stereoscopic (anaglyph) images, which inherently and expectantly may look blurry, in particular when reproduced in black and white. However, knowledgeable practitioners will be able to distinguish any relevant details, including any visual artifacts described in this disclosure. Detailed line-drawings are included for additional clarity and to aid the reader's understanding.

Figure 16:
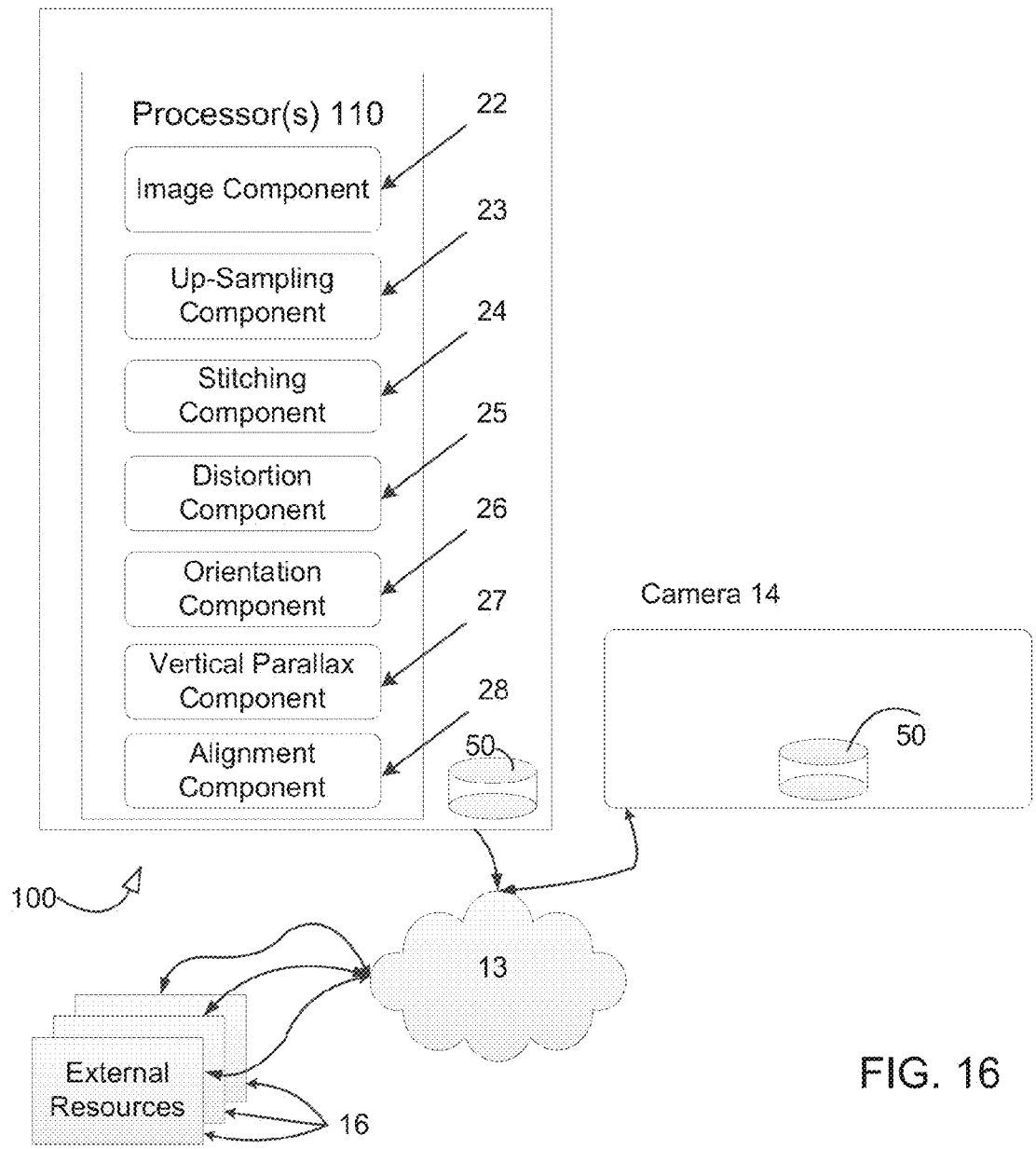
FIG. 16 illustrates a system 100 configured to generate stereoscopic panoramas, in accordance with one or more implementations.

FIG. 16 illustrates a system 100 configured to generate stereoscopic panoramas. System 100 may be configured to co-operate and/or communicate with one or more cameras 14. System 100 may include electronic storage 50, one or more processors 110, and/or other components. Processor 110 may be configured to execute one or more computer program components. The computer program components may be configured to enable a user to interface with system 100 and/or external resources 16, and/or provide other functionality described herein. System 100 may include communication lines, or ports to enable the exchange of information with a network and/or other computing platforms. System 100 may include a plurality of hardware, software, and/or firmware components operating together to provide the functionality described herein. For example, system 100 may be implemented by a cloud of computing platforms operating together.

External resources 16 may include sources of information, hosts and/or providers of (image) storage outside of system 100, external entities participating with system 100, and/or other resources. In some implementations, some or all of the functionality attributed herein to external resources 16 may be provided by resources included in system 100.

Electronic storage 50 of system 100 may be configured to store different information than electronic storage 50 of camera 14. System 100, camera 14, and/or external resources 16 may be operatively linked via one or more electronic communication links. For example, such electronic communication links may be established, at least in part, via a network 13 such as the Internet and/or other networks. It will be appreciated that this is not intended to be limiting, and that the scope of this disclosure includes implementations in which operative links and/or connections may be implemented via some other communication media.

System 100 may be configured to execute one or more computer program components. The computer program components may include one or more of an image component 22, an up-sampling component 23, a stitching component 24, a distortion component 25, an orientation component 26, a vertical parallax component 27, an alignment component 28, and/or other components.

High-resolution stereoscopic panoramas may have visual artifacts. This disclosure describes corrective steps and a compact representation for the input images in order to determine a highly accurate approximation of the required ray space. By virtue of flow-based up-sampling (e.g. by up-sampling component 23) of the available input rays (interchangeably referred to as captured images or input images), known aliasing issues, such as stitching artifacts, may be effectively reduced and/or resolved. The required rays (and/or interpolated image-fragments) may be generated on-the-fly to match the desired output resolution, even for small numbers of input images. Up-sampling may be performed in real-time, thus enabling direct interactive control over the desired stereoscopic depth effect. The disclosure enables the generation of stereoscopic panoramas at high output resolutions that are virtually free of various artifacts, including but not limited to seams, stereo discontinuities, vertical parallax, mono-/stereoscopic shape distortions, and/or other artifacts. The described features and/or techniques may be applied to other types of multi-perspective panoramas, such as linear panoramas.

Figure 1:
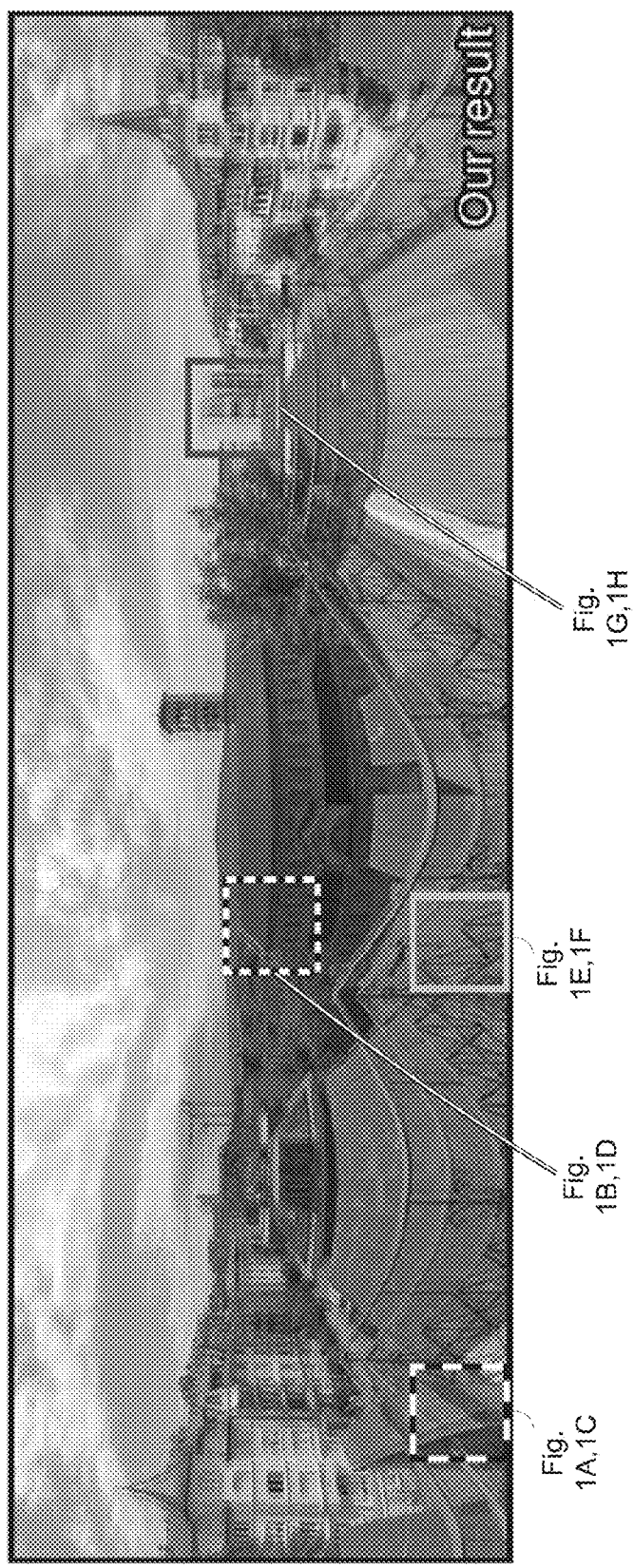
FIG. 1 illustrates a stereoscopic panorama.

There is a strong consumer interest in a more immersive experience of content, such as 3D photographs, television and cinema. Environmental content may be captured through panoramas. By way of non-limiting example, FIG. 1 illustrates a stereoscopic panorama with a gate or fence in the foreground (near the bottom of the image) and various buildings in the background. As depicted in FIG. 1, the panorama represents a red-cyan anaglyph. The square highlighted sections illustrates one or more visual artifacts and are labeled with reference numbers to line-drawings (from FIG. 1A to FIG. 1H) that illustrates additional details. FIGS. 1A-1B-1C-1D illustrate close-ups of visual artifacts in 2D. FIGS. 1E-1F-1G-1H illustrate close-ups of vertical parallax (using a representation of stereoscopic images).

Figure 1A:
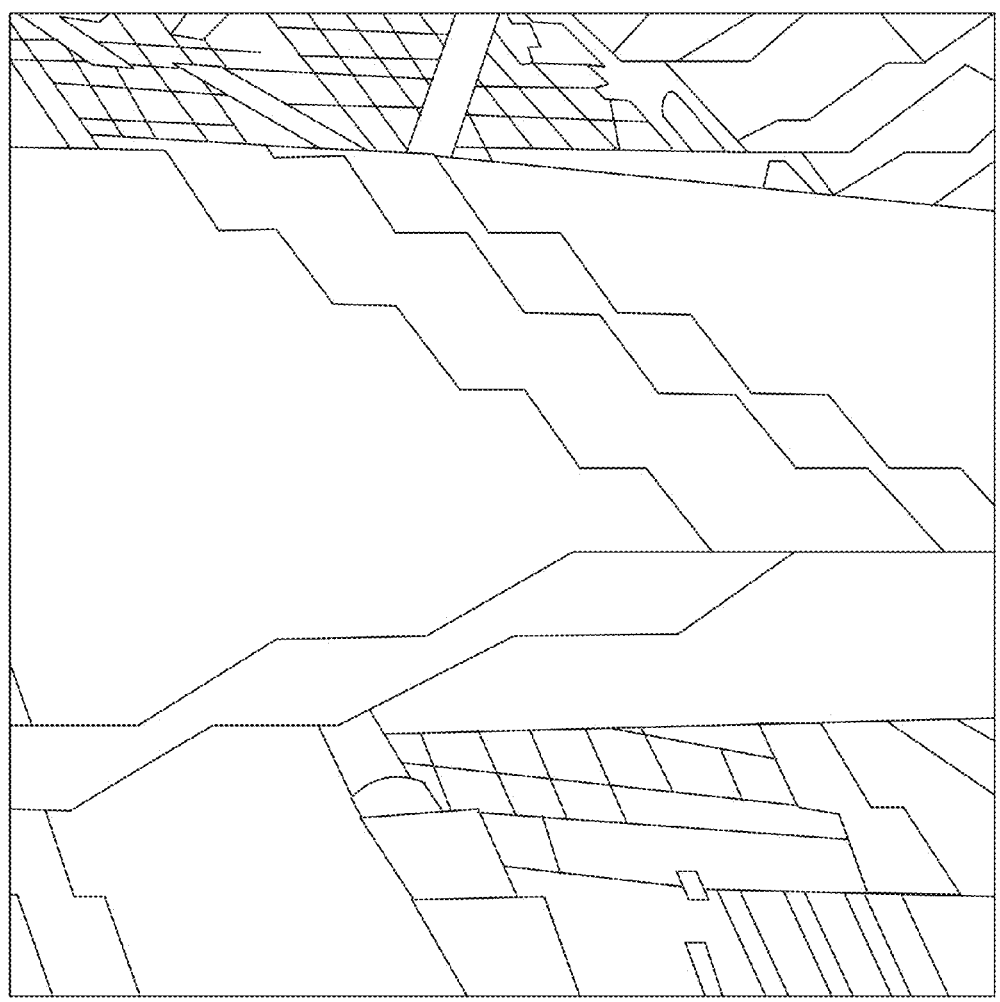
FIGS. 1A-1H illustrate details or close-ups of the panorama of FIG. 1 for known methods of panorama production and methods in accordance with one or more implementations.

FIG. 1A illustrates, at least, aliasing and stitching artifacts (as may be visible using known methods of panorama generation) for a section of FIG. 1 that depicts a fence or gate in which a brick or stone column has been embedded. FIG. 1C illustrates the same section as FIG. 1A, in which the visual artifacts are reduced and/or removed in comparison to FIG. 1A.

Figure 1B:
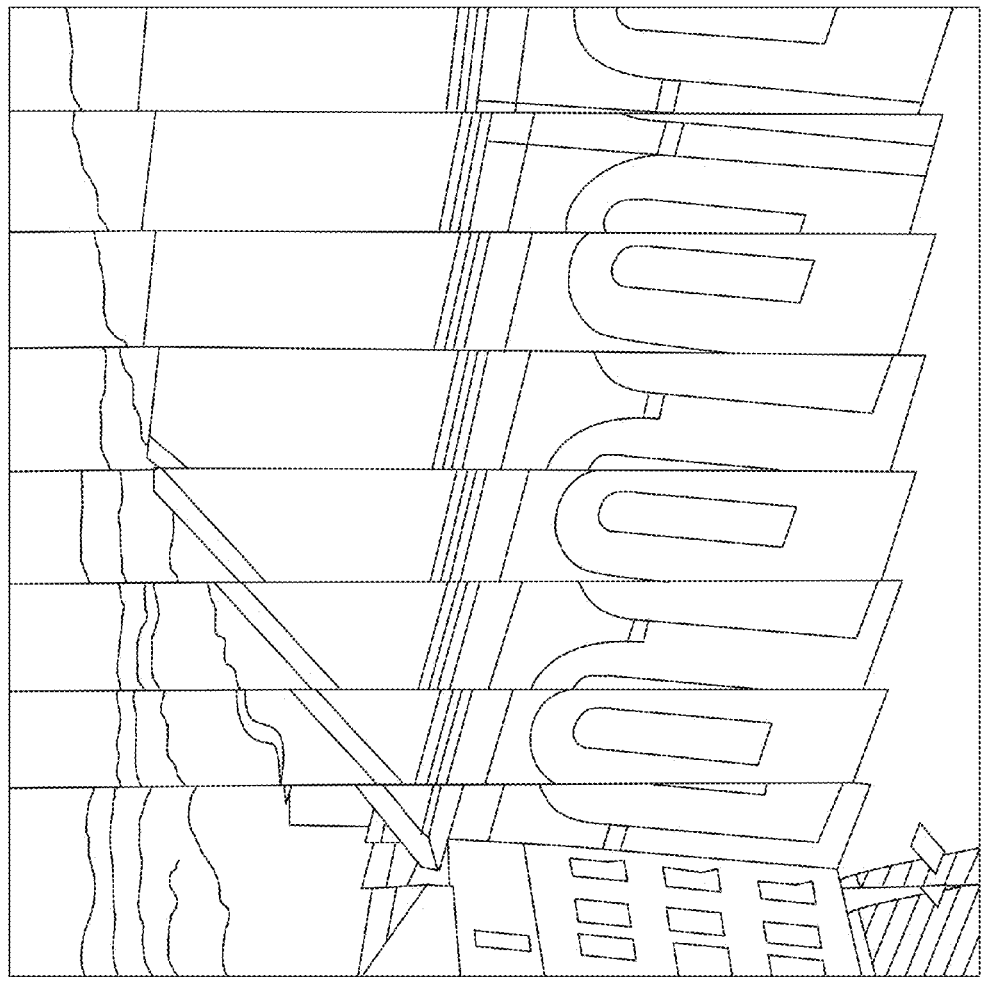
Figure 1C:
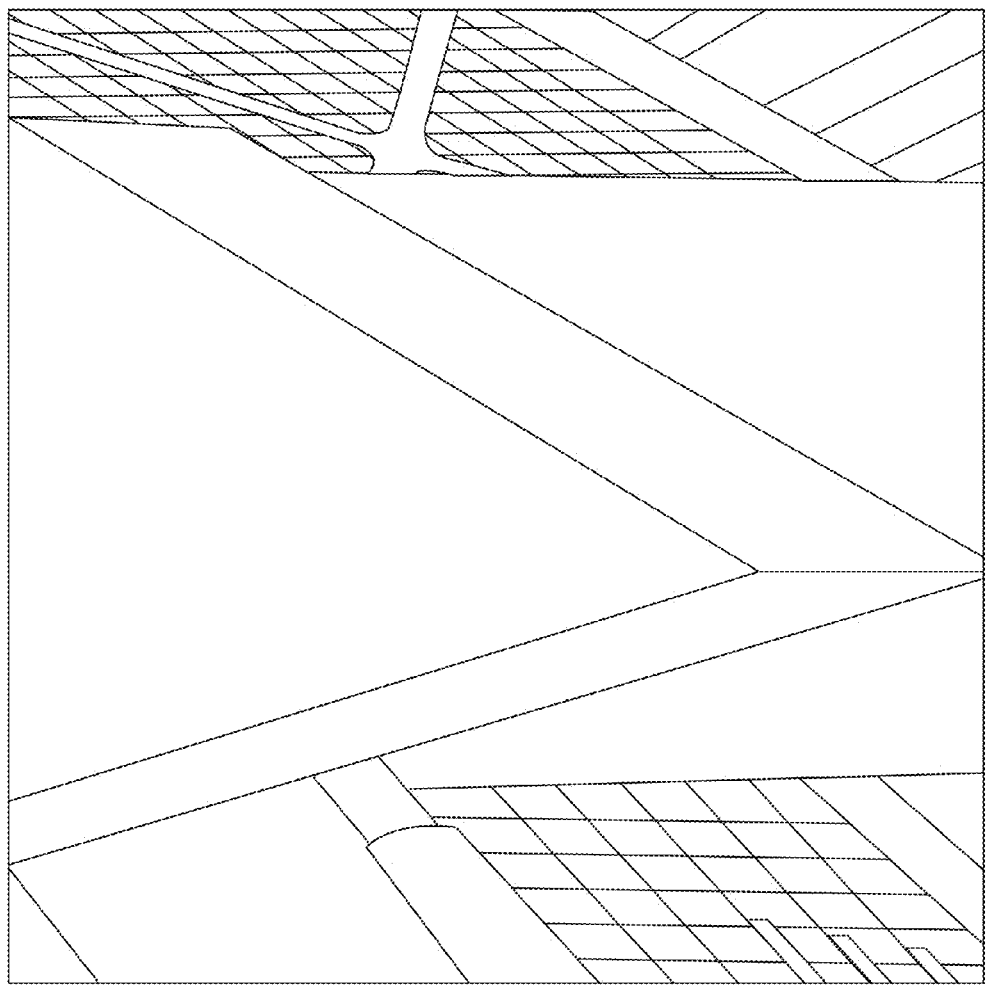
Figure 1D:
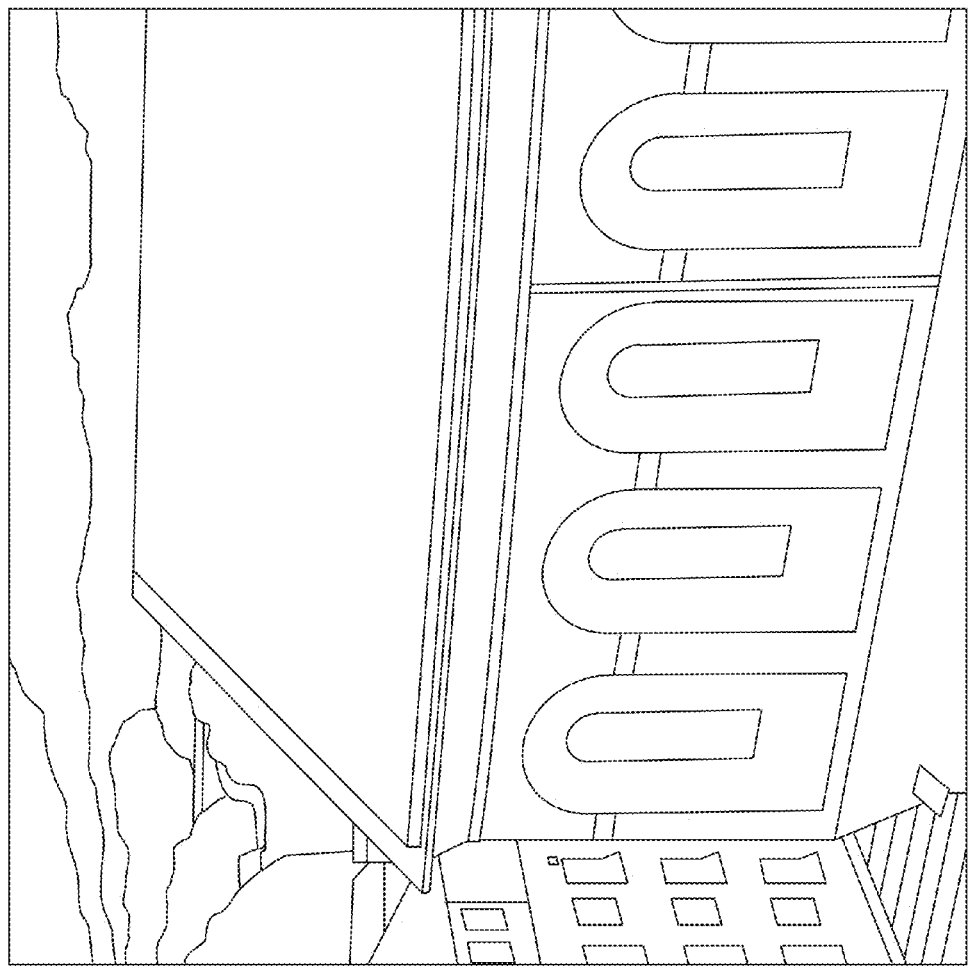

FIG. 1B illustrates, at least, duplication and stitching artifacts (as may be visible using known methods of panorama generation) for a section of FIG. 1 that depicts a building and at least three framed windows. Elements in this section are duplicated and shifted in FIG. 1B. FIG. 1D illustrates the same section as FIG. 1B, in which the visual artifacts are reduced and/or removed in comparison to FIG. 1B.

Figure 1E:
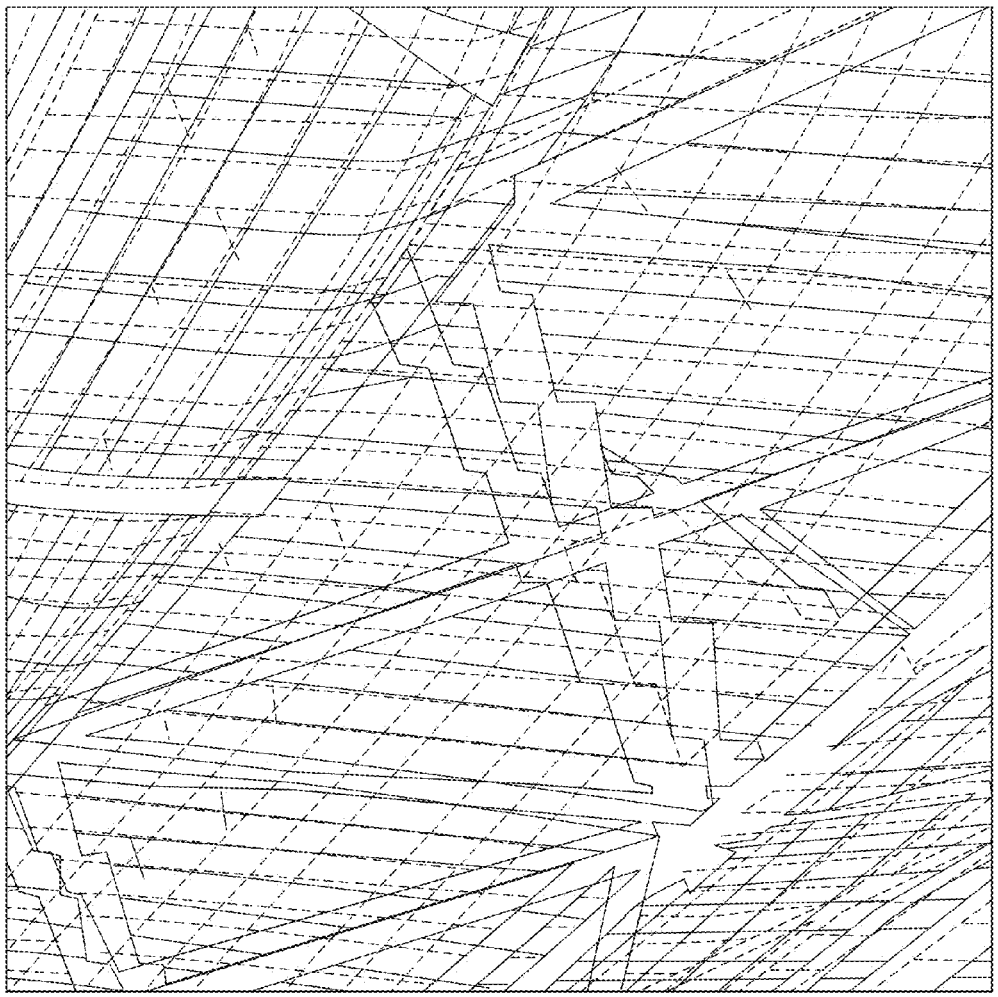
Figure 1F:
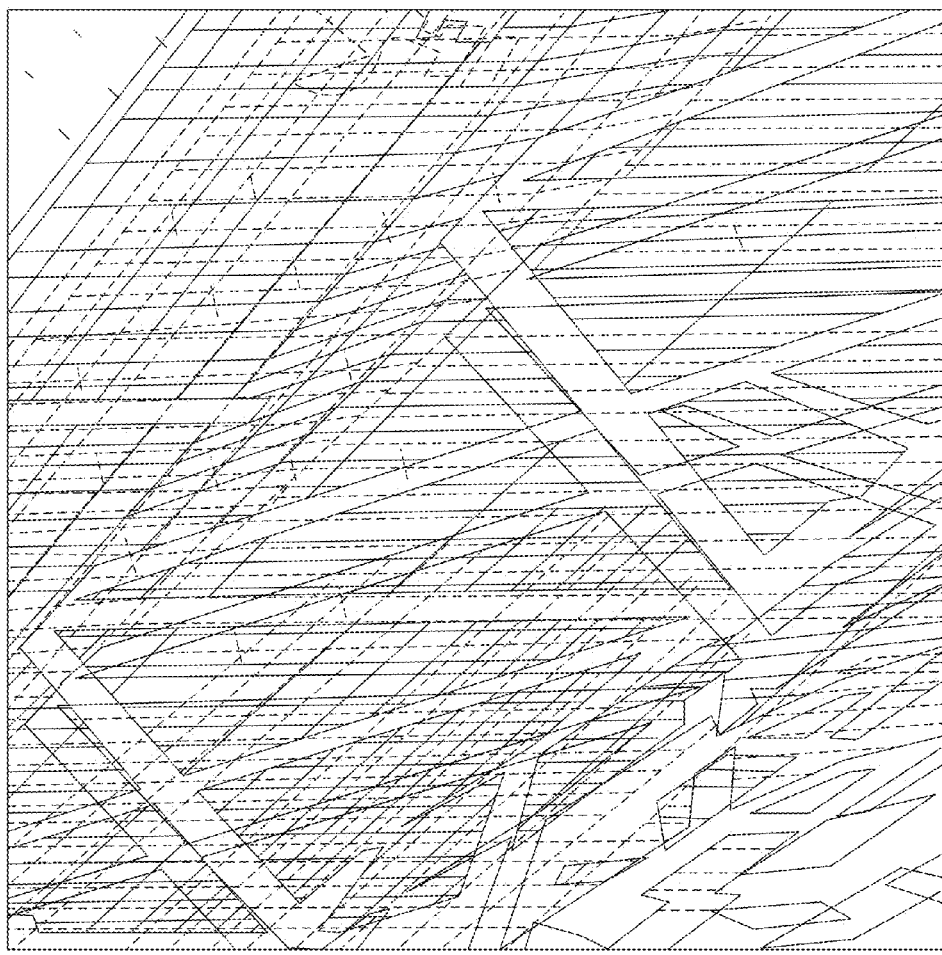

FIG. 1E is a stereoscopic representation in which the image for one eye uses solid lines and the image for the other eye uses dotted lines. FIG. 1E illustrates, at least, aliasing and distortion artifacts (as may be visible using known methods of stereoscopic panorama generation) for a section of FIG. 1 that depicts a fence or gate that includes diagonal structures. FIG. 1F illustrates the same section as FIG. 1E, in which the visual artifacts are reduced and/or removed in comparison to FIG. 1E.

Figure 1G:
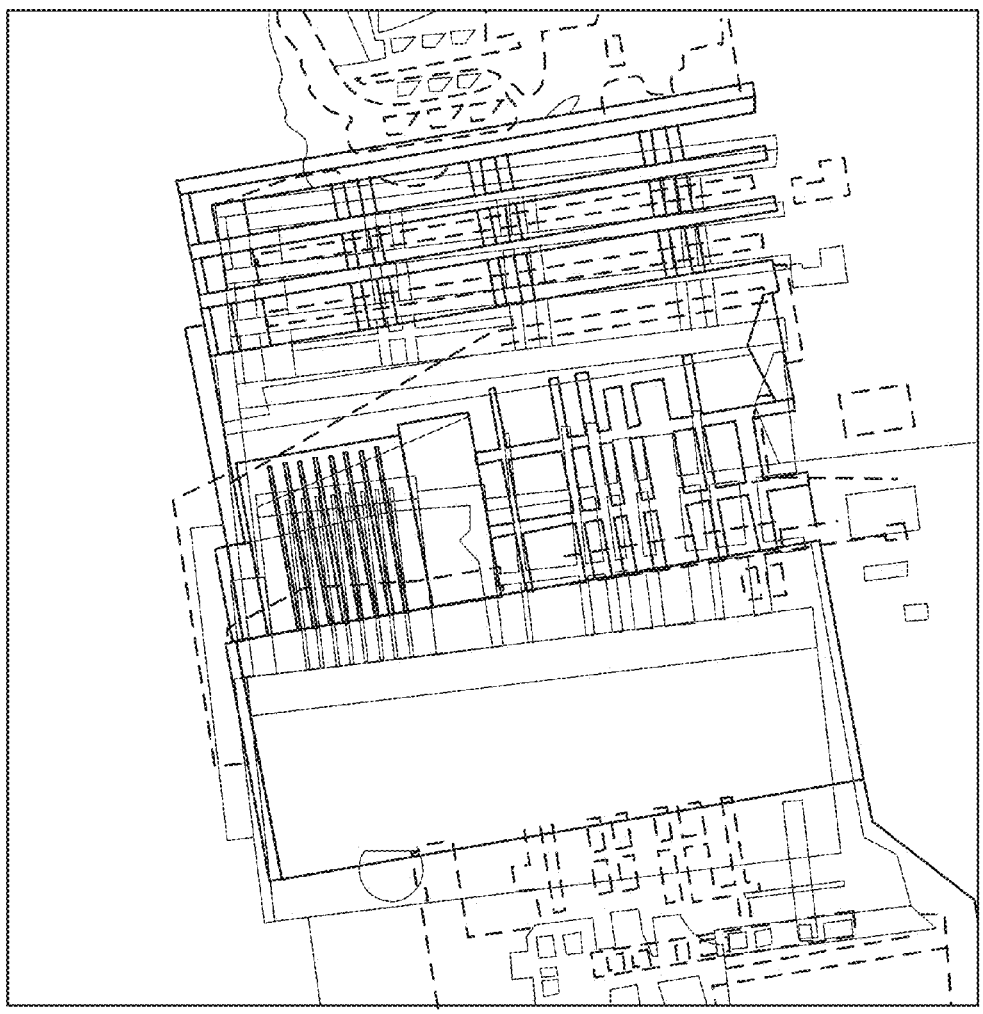
Figure 1H:
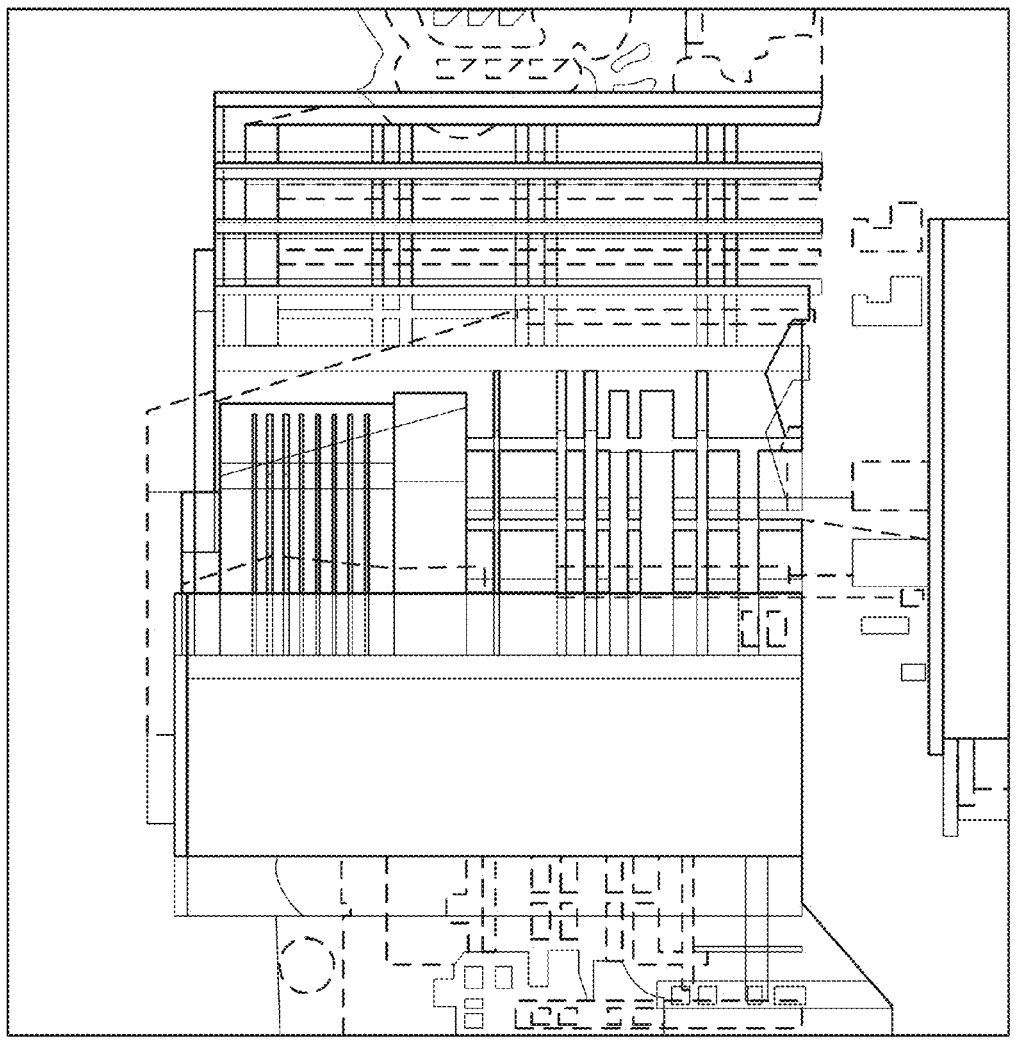

FIG. 1G is a stereoscopic representation in which the image for one eye uses solid lines and the image for the other eye uses dotted lines. FIG. 1G illustrates, at least, orientation and distortion artifacts (as may be visible using known methods of stereoscopic panorama generation) for a section of FIG. 1 that depicts a building. FIG. 1H illustrates the same section as FIG. 1G, in which the visual artifacts are reduced and/or removed in comparison to FIG. 1G.

Automatic tools for stitching panoramas from multiple (input) images may be available, even in consumer cameras. For circular 360° panoramas, a user may use, expect to use, and/or be required to use a common camera center for all images. Using a common center minimizes stitching artifacts. This may be achieved by rotating the camera around its optical center. However, such panoramas inherently lack parallax and therefore cannot be experienced stereoscopically.

To overcome this limitation, motion parallax may be explicitly captured by taking images with varying centers of projection, e.g. by mounting the camera on a rotating arm. By way of non-limiting example, such a capture setup is illustrated in the right-hand section of FIG. 2, in which the dotted arrow indicates camera movement. A stereoscopic panorama may be created by stitching together specific strips from the captured input views. While successfully introducing parallax, this strategy may suffer from a number of unresolved practical issues that cause disturbing artifacts such as visible seams or vertical parallax in the panorama. Image-quality issues in 2D may lead to considerable misperceptions and even become intolerable when viewed stereoscopically.

One reason for these artifacts is that in practice a camera can capture light rays only at quite a limited spatio-angular resolution, i.e. a finite set of images with finite resolution. This insufficiently-dense sampling of the scene manifests itself as visible discontinuities in the (generated) output panorama in areas where neighboring output pixels have been synthesized from different input views having strong parallax between them. Capturing more and higher resolution images may not be a practically feasible solution, since this would result in orders of magnitude more data while not fully resolving those issues. Secondly, while the optical centers of all camera positions should ideally lie on a perfect circle to create panoramas, in practical acquisition scenarios, and especially for hand-held capture (as illustrated in the left-hand section of FIG. 2, in which the dotted arrow indicates camera movement), this may be difficult to achieve.

By virtue of this disclosure, automated, high-quality, virtually artifact-free stereoscopic panorama generation may be provided through system 100. System 100 may be configured to compensate for deviations from an ideal capture setup, e.g. through operations of orientation component 26. Specifically, the captured images may be corrected to resolve issues caused by perspective distortion and vertical parallax (e.g. by vertical parallax component 27). System 100 may be configured to obtain alignment of the captured images with minimal drift, e.g. through operations of alignment component 28. System 100 may be configured to reduce visible seams caused by the truncations and duplications of objects. The set of captured and corrected light rays (or images) may be up-sampled using optical flow-based interpolation techniques (e.g. by up-sampling component 23). In effect, a (nearly and/or virtually) continuous representation of the ray space may be achieved. System 100 may be configured to sample from this representation, and with real-time control over the resulting stereo effect.

The disclosed techniques may be used for any multi-perspective imaging method based on stitching, like x-slit, pushbroom, or general linear cameras. Multi-perspective approaches combine images taken from different viewpoints to create mosaics that cannot be obtained from a single center of projection. For example, pushbroom images may be stitched from images taken by a linearly moving camera. This may be well suited for capturing buildings along a street. However, existing approaches cannot capture both a 360° view of the scene and stereoscopic depth. For panoramas the camera may be moved along a circular trajectory with either a tangential or orthogonal camera viewing direction. The latter may be referred to as omni-stereo panoramas. These approaches capture a range of viewpoints for the same panorama, thus in theory allowing stereoscopic renderings with varying baseline.

System 100 may be configured to stitch the images into a panorama, responsive to alignment of the images relative to each other. Such alignment may amount to estimation of the camera motion. This may be accomplished with a purely image-based method that estimates a parameterized motion model (e.g. a 2D homography) from image correspondences. In some implementations, estimation may use image registration techniques. Image-based methods may lack knowledge of the scene geometry (e.g. depth) and only compute the optimal 2D alignment. This may cause artifacts if the scene has a complex depth structure. In some implementations, the scene depth of the panorama may be estimated and used to compute the ego motion of the camera, i.e. the image motion scaled by the depth. With this information, system 100 may be configured to compute an optimal (possibly curved) shape of each strip to be pasted. However, estimating the shape of strips as well as the depth may be computationally expensive, while not resolving all problems.

To obtain high-quality alignment, system 100 may be configured to leverage structure-from-motion algorithms to estimate the full 3D camera position, location, and/or movement. Such an approach may allow for global optimization of camera poses.

During stitching of multi-perspective images, parallax may lead to disturbing seams, i.e. discontinuities between the stitched strips. One way to alleviate this problem may be to blend between the strips using strategies like simple linear (alpha), pyramid-based, or gradient-domain blending. These strategies effectively attempt to hide the discontinuities and thus only work well for mild seams. In the presence of significant discontinuities caused by strong parallax, the results may include noticeable artifacts. In the context of omni-stereo panoramas, concise control over the resulting output parallax may be required in order to achieve proper stereoscopic viewing. While the above blending approaches might be applicable for monoscopic stitching, in stereoscopic 3D the resulting inconsistencies may become more noticeable and/or unacceptable.

A reduction of artifacts may be accomplished by using more images to get a denser angular sampling of the scene, resulting in thinner strips and smaller discontinuities. This can be achieved by leveraging depth or optical flow information to interpolate novel virtual views. For practical considerations all interpolated images cannot be stored, in particular for high spatial resolutions. Furthermore, denser angular sampling may still leave some artifacts for thin vertical structures as they may be missed in depth or flow estimates. In such cases, system 100 may automatically use an alternative approach, including but not limited to linear blending, which at these small locations allows to remedy the stitching problems and degrades gracefully. In some implementations, system 100 may be configured to combine multiple blending techniques (simultaneously and/or subsequently) responsive to a determination that doing so may reduce artifacts.

Optical flow may also be used for improving hand-held capture of 2D panoramas, to remove the (in this case) undesired motion parallax.

Figure 2:
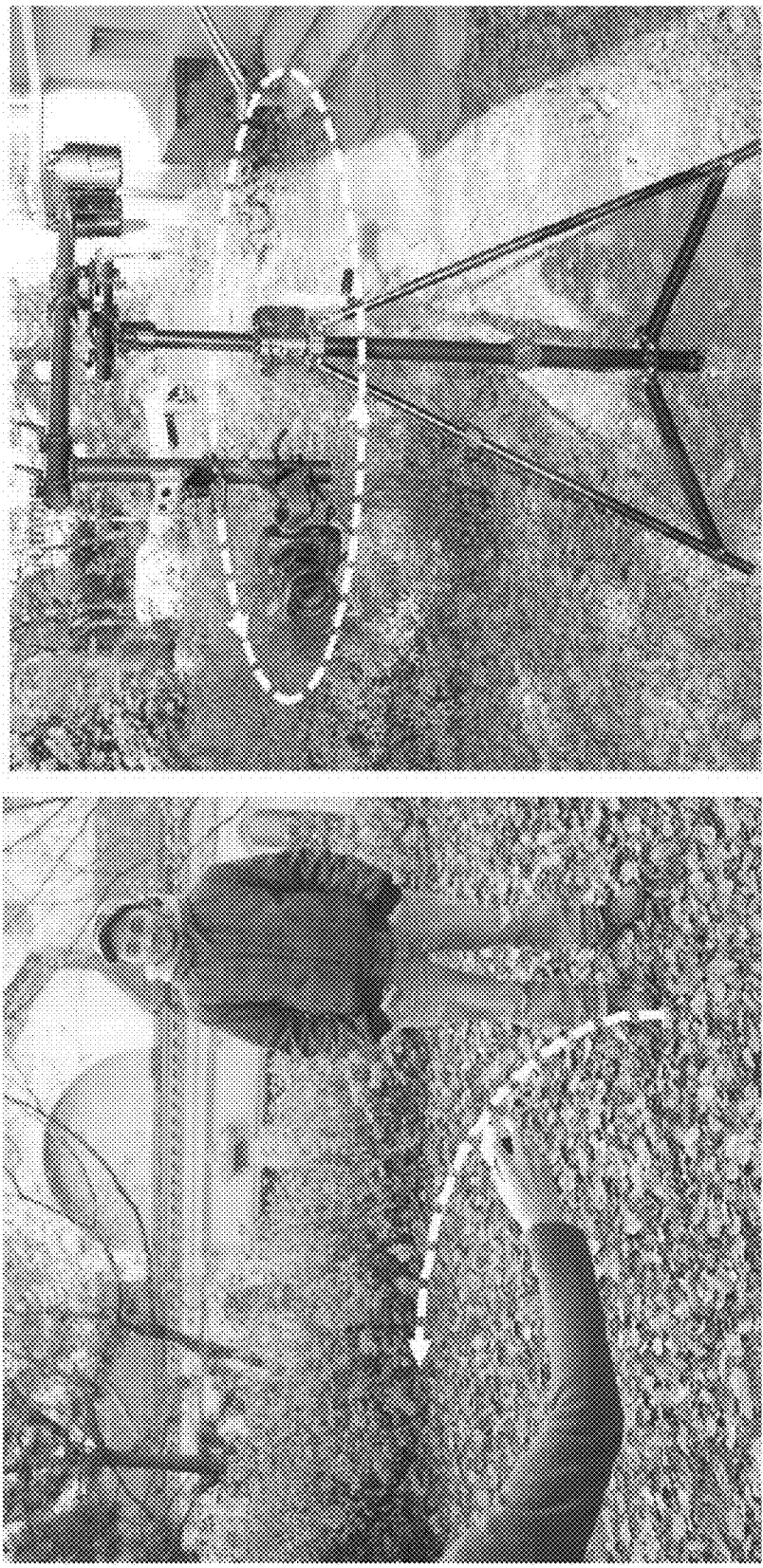
FIG. 2 illustrates examples of a hand-held capture setup and a mounted capture setup in accordance with one or more implementations.
Figure 4:
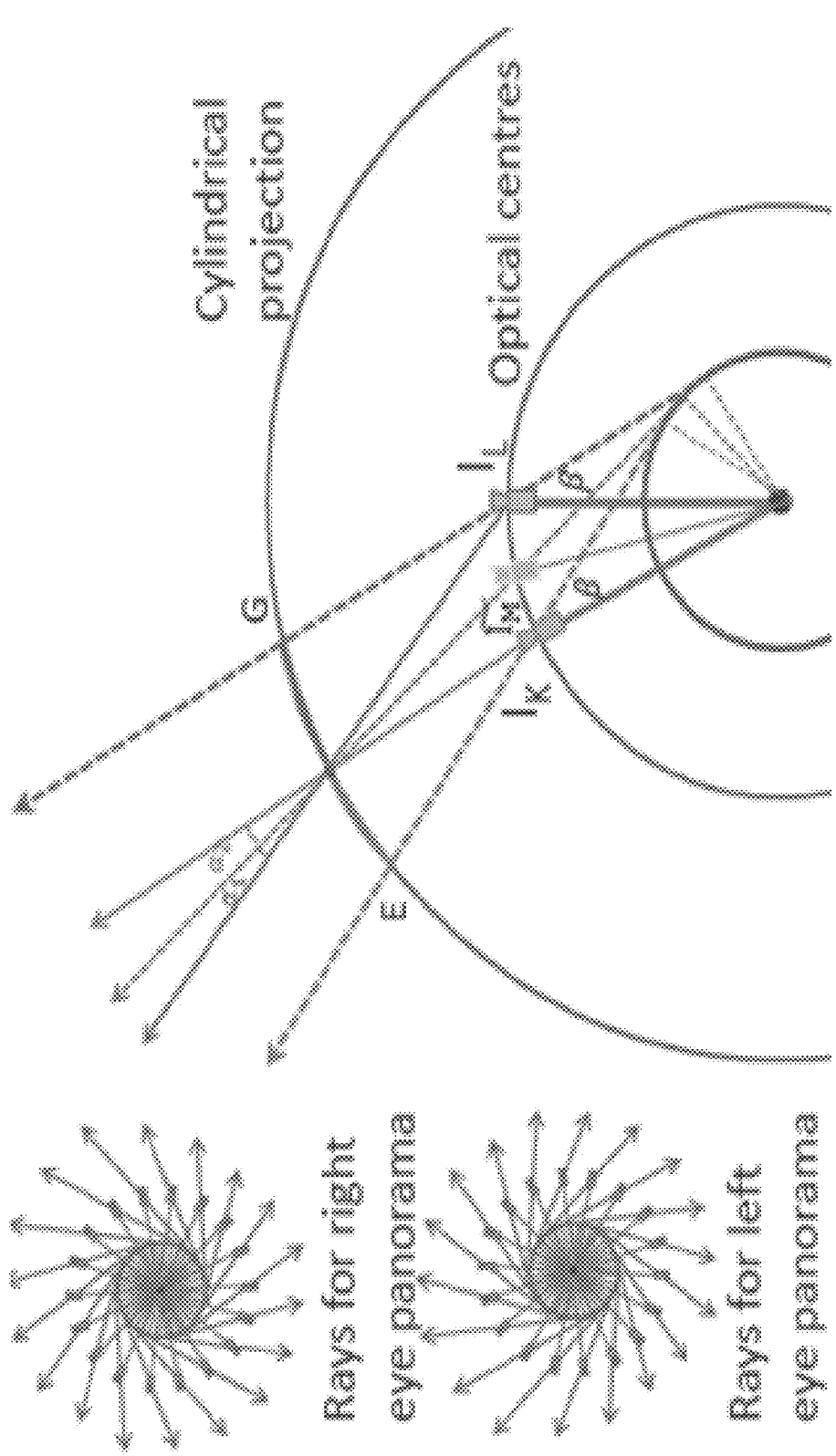
FIG. 4 illustrates principles for achieving an omni-stereo effect in accordance with one or more implementations.
Figure 5:
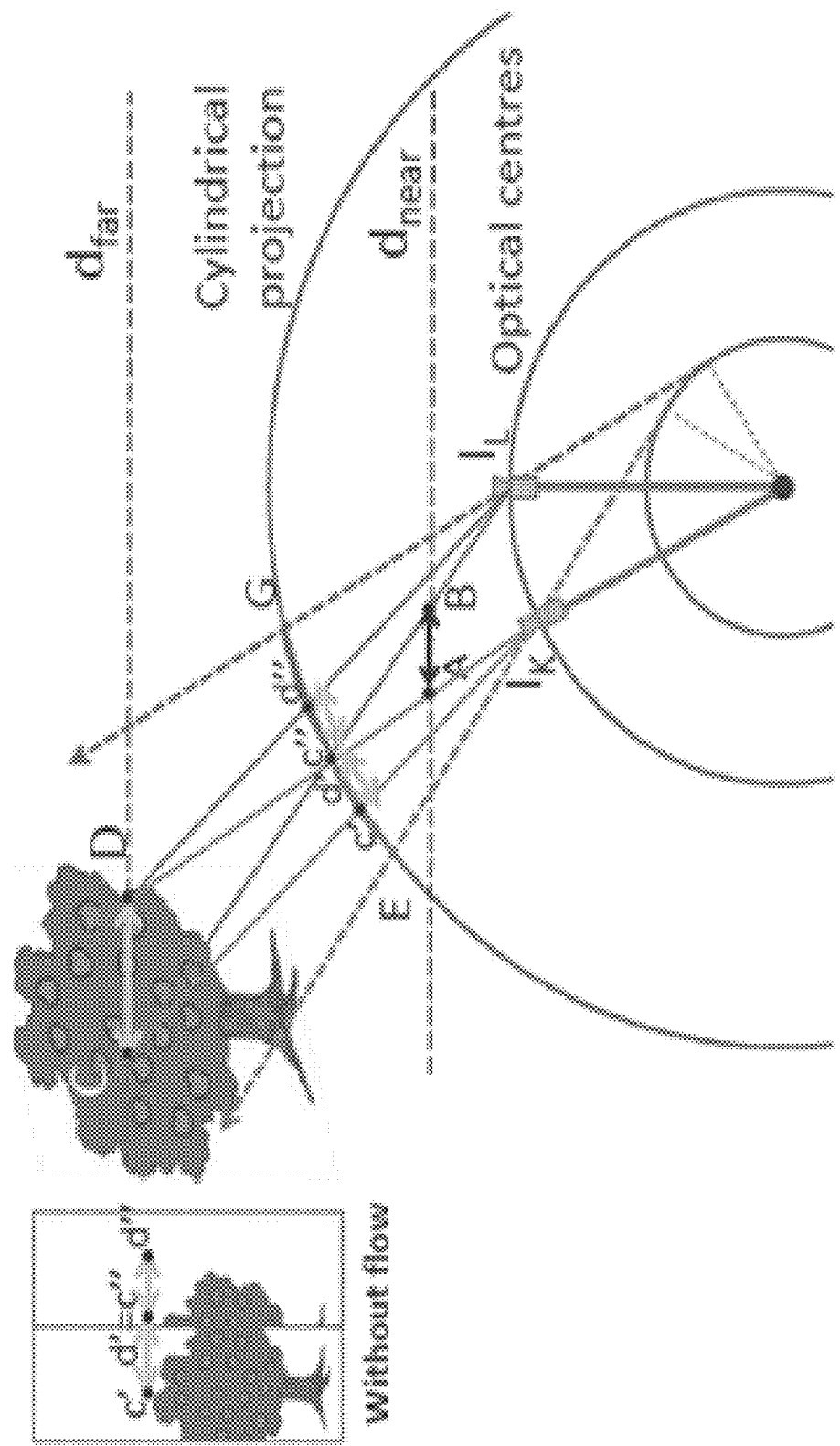
FIG. 5 illustrates aliasing artifacts related to FIG. 4.
Figure 6:
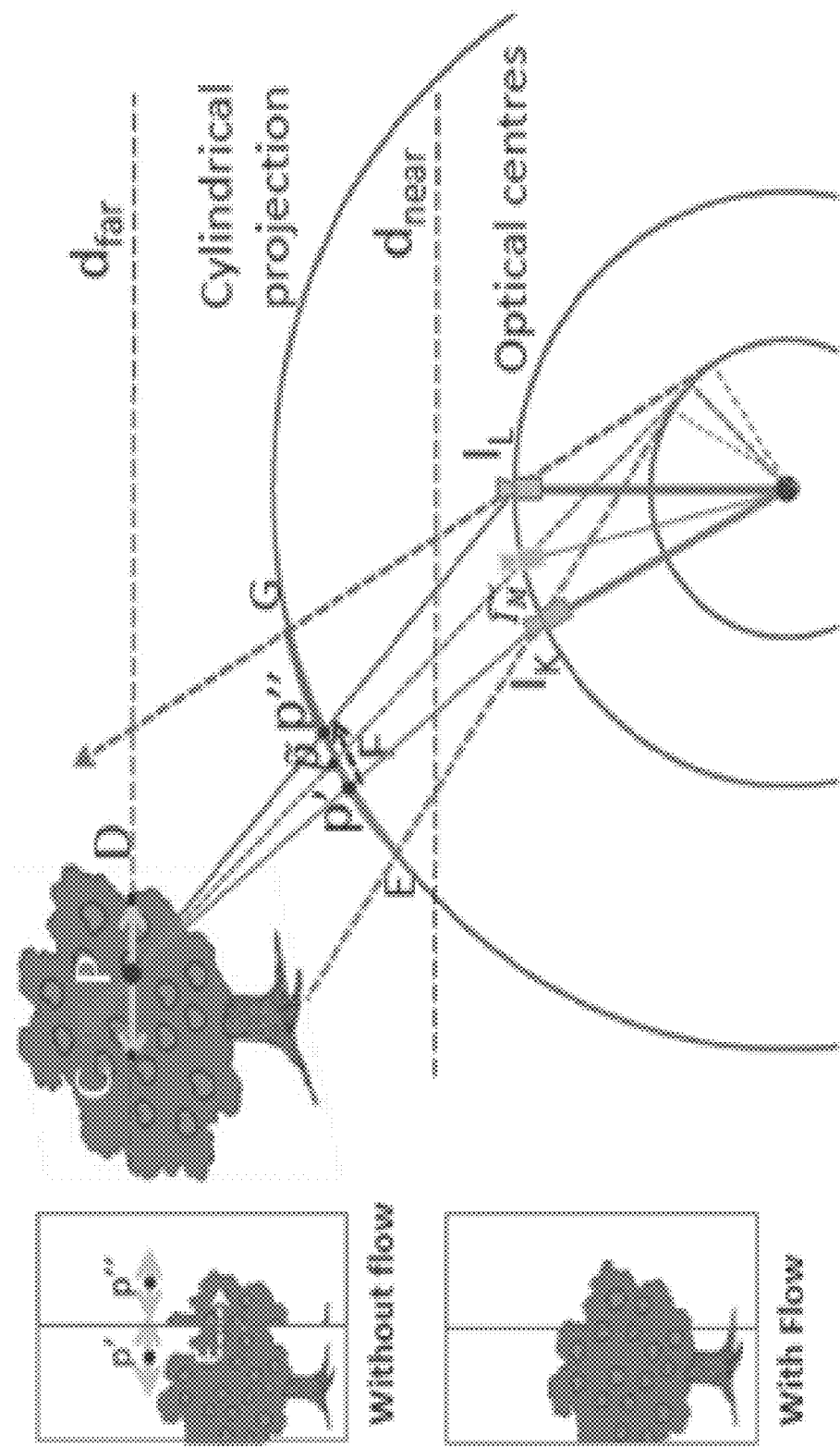
FIG. 6 illustrates a resolution to the aliasing artifacts of FIG. 5.

Omni-stereo panorama generation may be based on creating two sets of light rays: one for the left eye and one for the right eye, ideally with all rays and/or camera directions tangential to a circle. By way of non-limiting example, FIG. 4 illustrates the rays required to generate such a panorama. In practice, systems usually capture an image set with a camera moving along a circular trajectory with its principal axis parallel to the plane spanned by the camera trajectory, as depicted in FIG. 2. An omni-stereo panorama may be created by stitching, for each eye, specific vertical strips from the aligned images, such that the ray geometry as depicted in FIG. 4 may be approximated. By way of illustration, FIG. 5 illustrates duplication and truncation artifacts caused by aliasing. By way of illustration, FIG. 6 illustrates flow-based up-sampling to synthesize required rays and/or image-fragments.

This approximation to the desired ray geometry typically suffers from inaccuracies of the capture setup and limited angular sampling, resulting in the previously mentioned artifacts. By using a specific transformation and alignment approach (including, but not limited to, employing camera orientation correction, cylindrical image re-projection, and optimized homography matching) visual artifacts may be reduced.

In practice the angular sampling may be sparse, e.g. using a limited number of input images. This may further deteriorate the approximation quality and may lead to aliasing artifacts (e.g. seams, truncation, and/or duplication).

Input correction may include optical undistortion to better approximate a pinhole model, correction of camera orientation, vertical parallax compensation, compact representation via 2D alignment, and/or other types of corrections and/or improvements. Input correction may be accomplished and/or performed by one or more components, including, but not limited to, stitching component 25, vertical parallax component 27, and/or other components.

For capturing stereoscopic panoramas, it may be beneficial to use wide-angle lenses to capture images with significant overlap and a large vertical field of view. Due to the optical distortion introduced by those lenses, approximation of the desired ray geometry may include converting images to correspond to a pinhole camera model. Rational lens distortion models may provide better results than the standard polynomial approach targeting simpler radial and tangential lens distortion.

Any deviation from an ideal capture setup (e.g. circular trajectory and parallel principal axis) may lead to visible shape distortions in a stereoscopic output panorama (e.g. tilted buildings, vertical parallax). System 100 may be configured to correct the orientation and viewing direction of each input view to approximate an ideal setup, for example by orientation component 26.

The camera poses may be estimated using general structure-from-motion with global bundle adjustment. For purely circular motions, restricted models could be used in principle, such as enforcing the camera positions to lie on a circle. However, a more general approach enables creation of omni-stereo panoramas from hand-held input and/or other camera trajectories, including, but not limited to, a straight line. Inherent scale ambiguity may be removed by scaling coordinates so that the camera's trajectory conforms to the actual physical dimensions.

Individual camera coordinate frames may be rotated towards the idealized setup with a single consistent up-direction and consistent viewing directions that are perpendicular to the camera trajectory. By rotating around the optical center (e.g. using a homography) the transformation may be scene independent and hence does not introduce inaccuracies. Let $P=KR[I|-\tilde{C}]$ be the decomposition of a camera's projection matrix into intrinsics K, rotation R and the camera center $\tilde{C}$. Further let $R=[x|y|z]$ represent the left, up and viewing direction of that camera, respectively. System 100 may be configured to compute a consistent up direction "u" across multiple images. For omni-stereo panoramas, we obtain "u" by fitting a circle to all camera centers and using the normal vector n of the plane the circle lies in: u=n. For other trajectories (e.g. linear as for pushbroom panoramas), system 100 may be configured to compute "u" as the mean up direction of the individual camera coordinate systems. The mean up direction may also be used to disambiguate the normal direction in the omni-stereo case, by choosing the direction that is closer to the mean up direction. Given the new up direction, the corrected coordinate frame may be computed as follows: the new viewing direction becomes v=u×x, and the new left direction is w=v×u (here we assume that the vectors are normalized before each step). The rotation that needs to be applied to a camera then is R'=[w|u|v]$^T$R$^{-1}$. This rotation is equivalent to the 2D homography H=KR'K$^{-1}$ applied to the image and achieves the desired idealized capture setup.

By way of non-limiting example, FIG. 3 illustrates the effect of, at least, this transformation and alignment, for a scene depicting a street with buildings on either side and a lamppost on the left side. The images in the top row of FIG. 3 have been captured as the camera moved from a right-most position (FIG. 3C), to a center position (FIG. 3B), and finally to a left-most position (FIG. 3A). In other words, FIGS. 3A-3B-3C form the captured, or "raw" images. Each subsequent row below this top row illustrates one or more particular types of artifact-reduction based on the image directly above it. For example, the center image in the top row is processed to produce the center image in the row below it, then further processed to produce the center image in the row below it, and finally processed again to produce the center image in the bottom row.

Figure 3A:
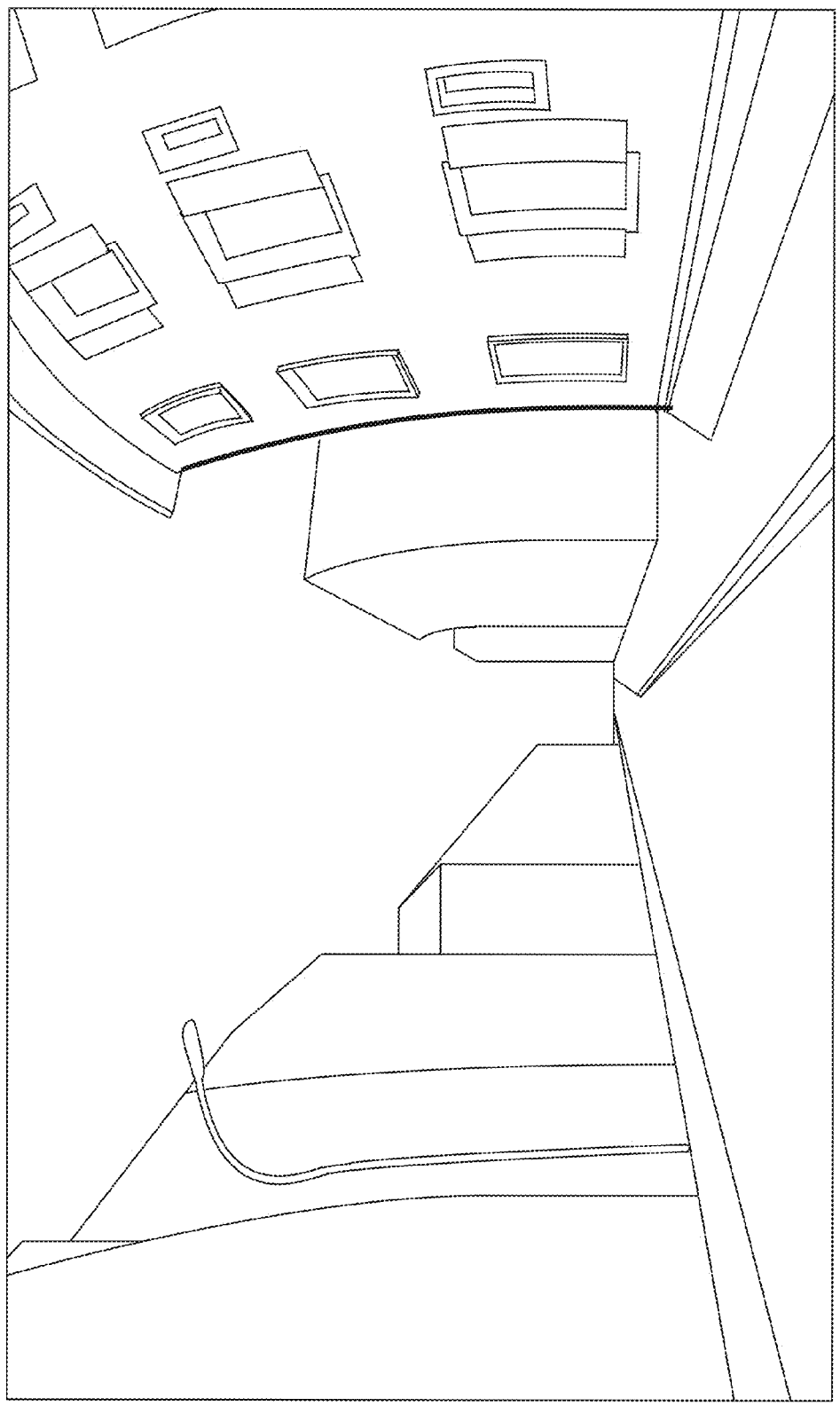
Figure 3B:
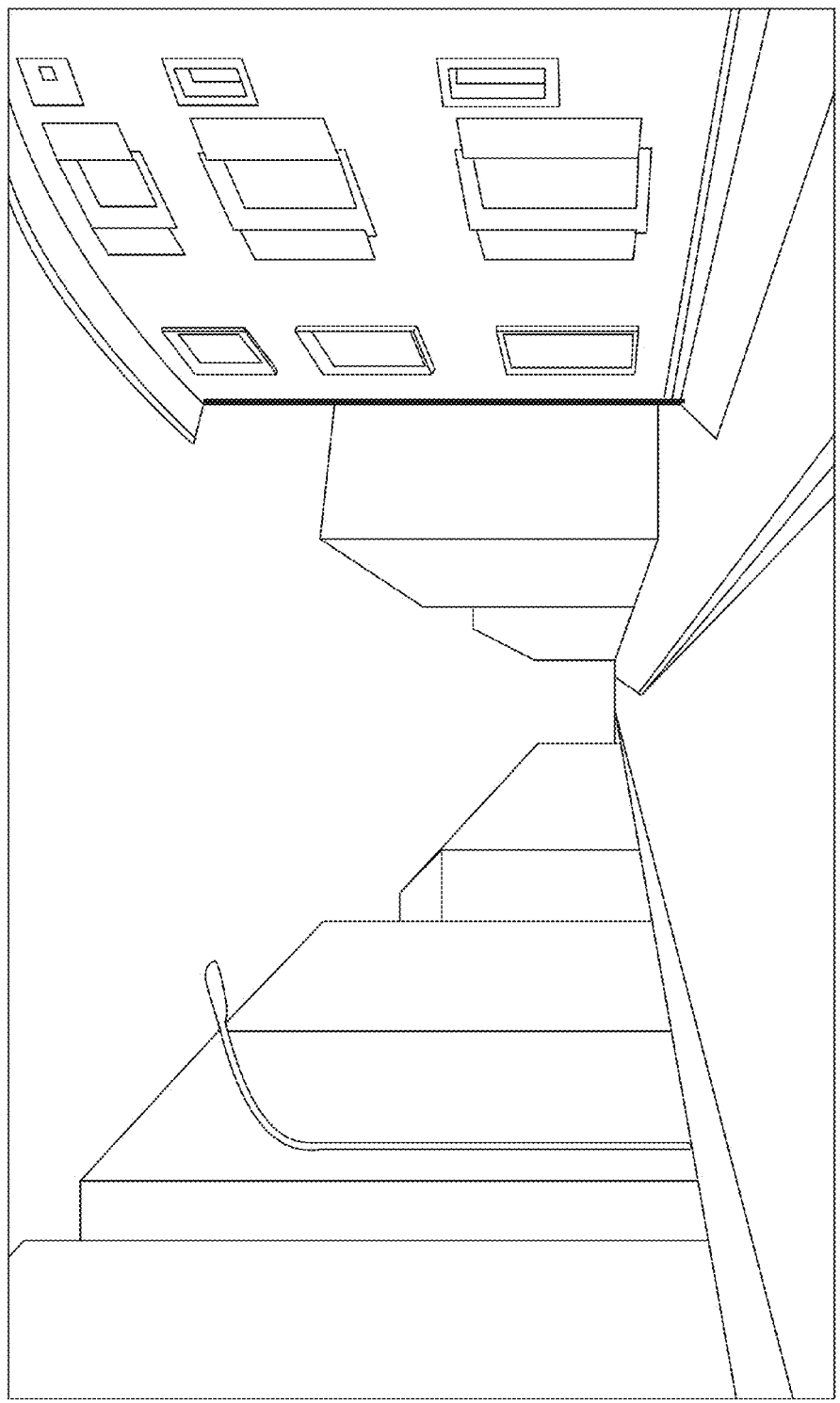
Figure 3C:
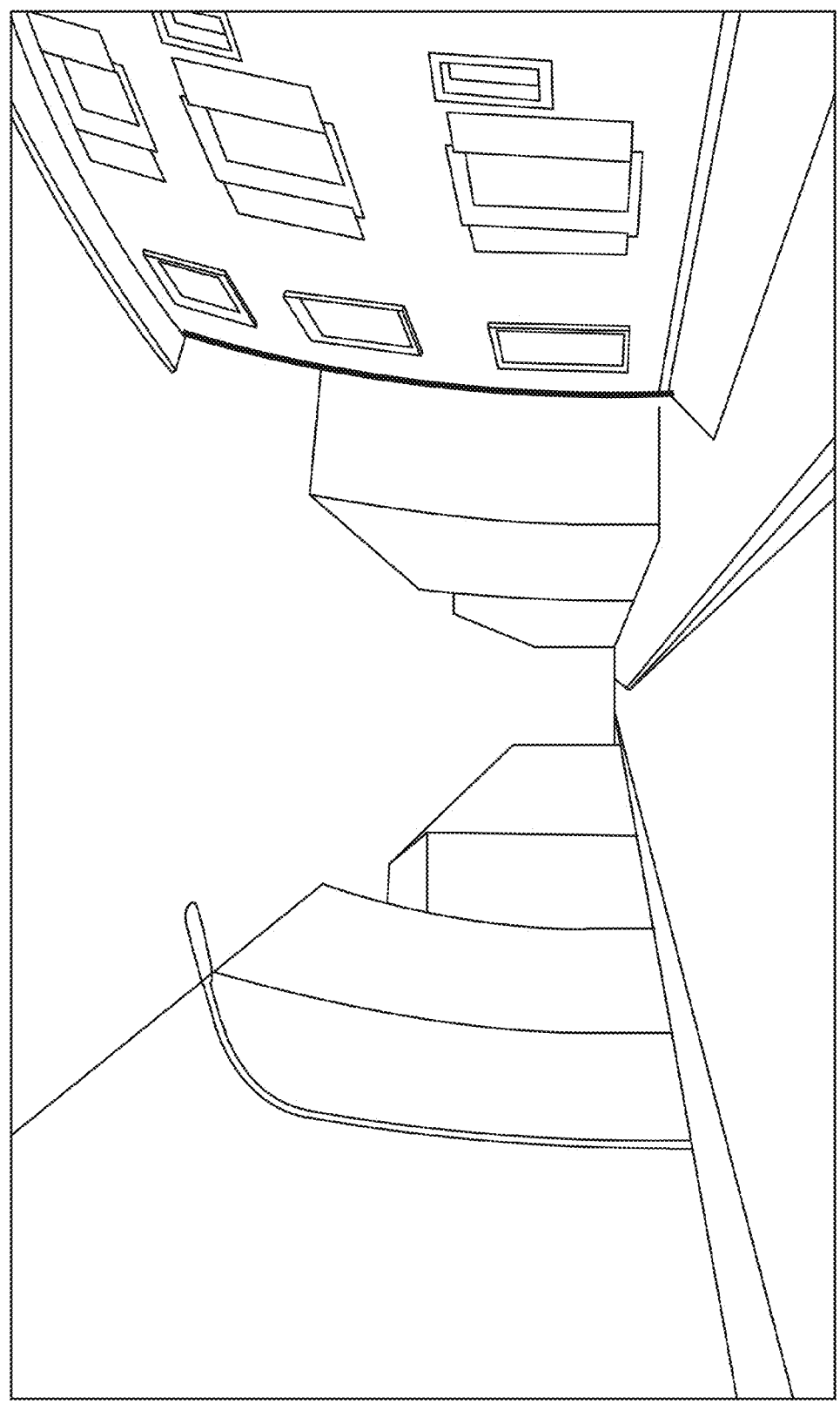

FIG. 3A illustrates the captured image at the left-most position. FIG. 3A illustrates, at least, lens distortion that has warped the image. FIG. 3B illustrates the captured image at the center position. FIG. 3C illustrates the captured image at the right-most position. FIG. 3C illustrates, at least, lens distortion that has warped the image. By virtue of performing the process referred to as "lens undistortion" (explained elsewhere in this disclosure), FIGS. 3A-3B-3C are converted/processed/transformed into FIGS. 3D-3E-3F, respectively.

Figure 3D:
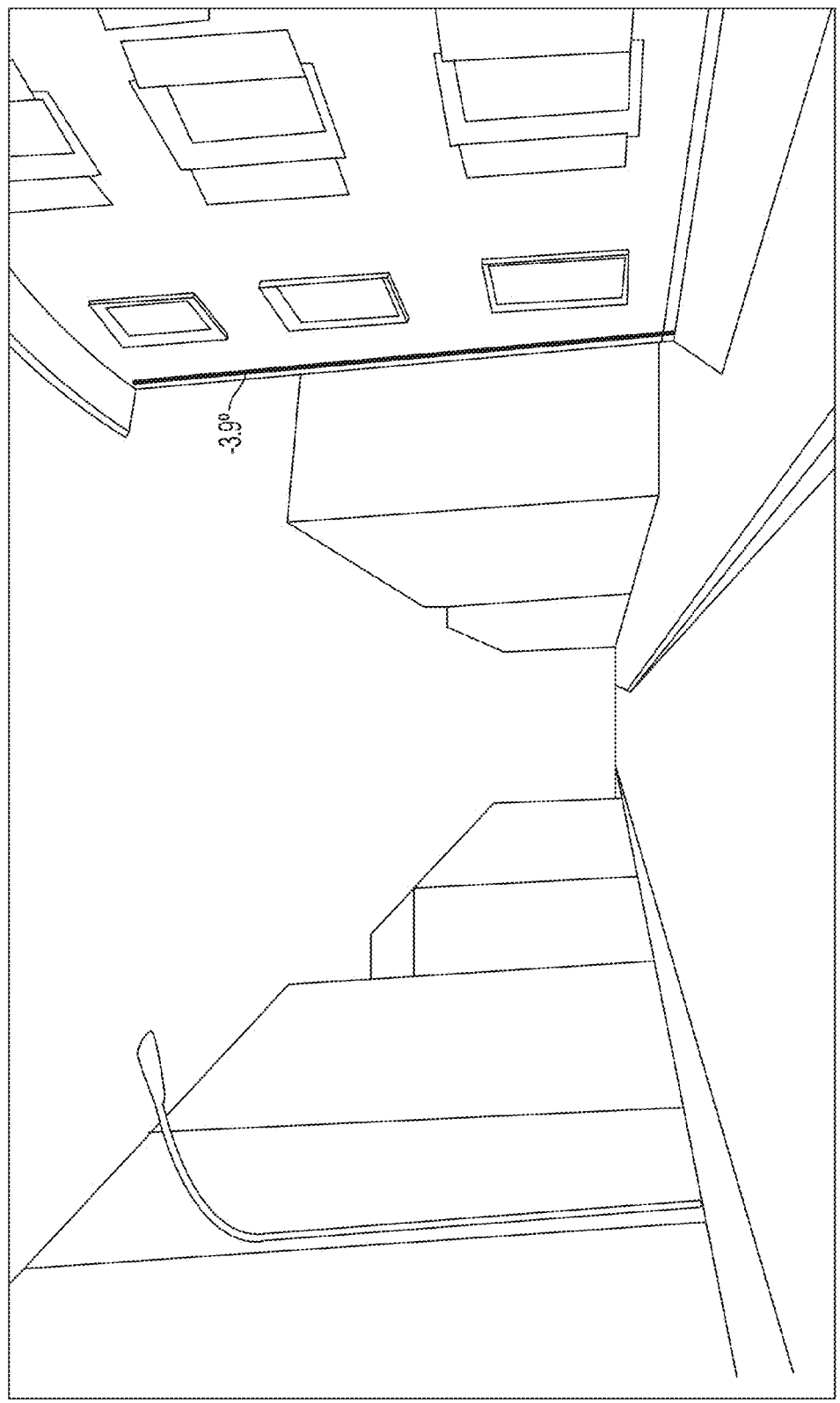
Figure 3E:
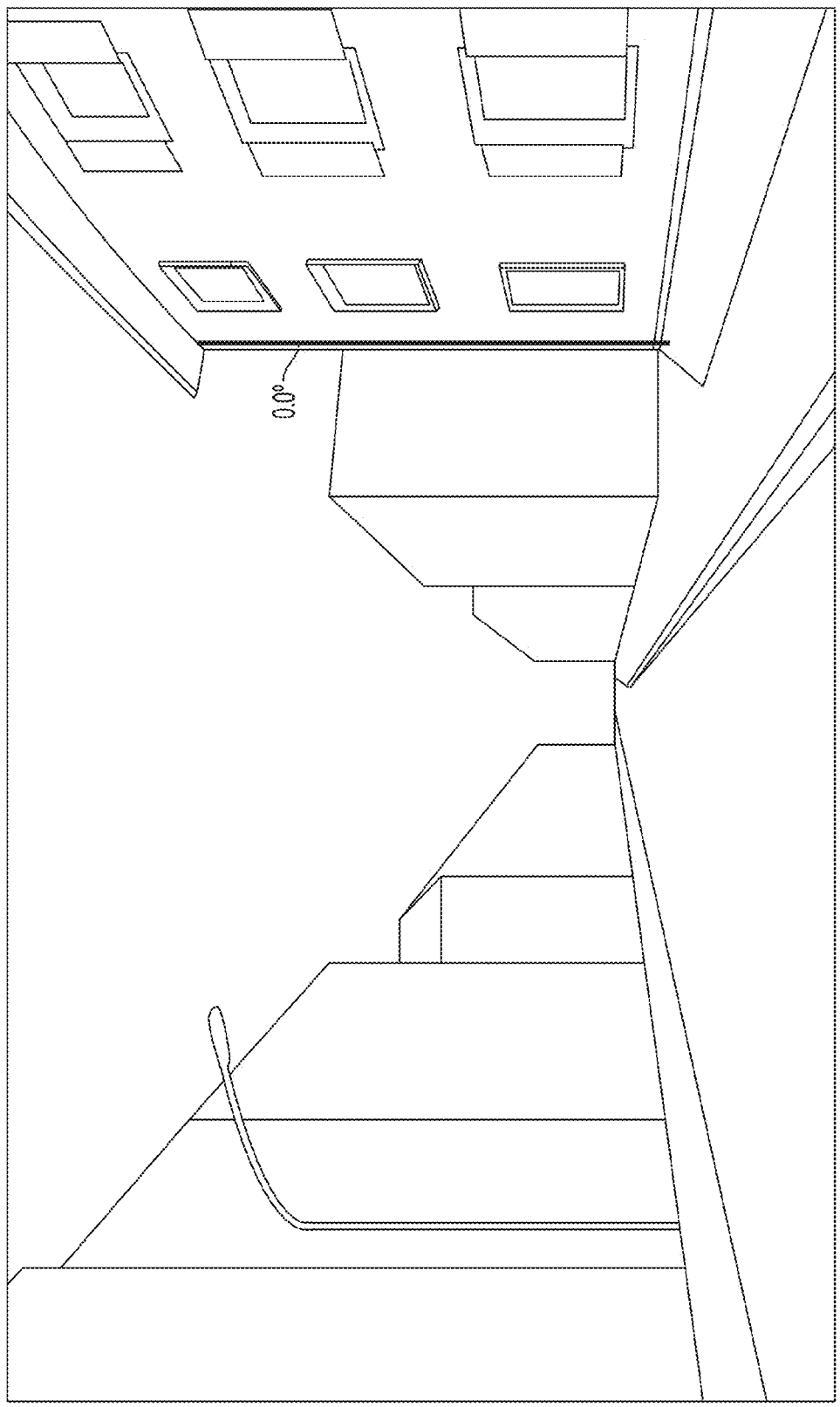
Figure 3F:
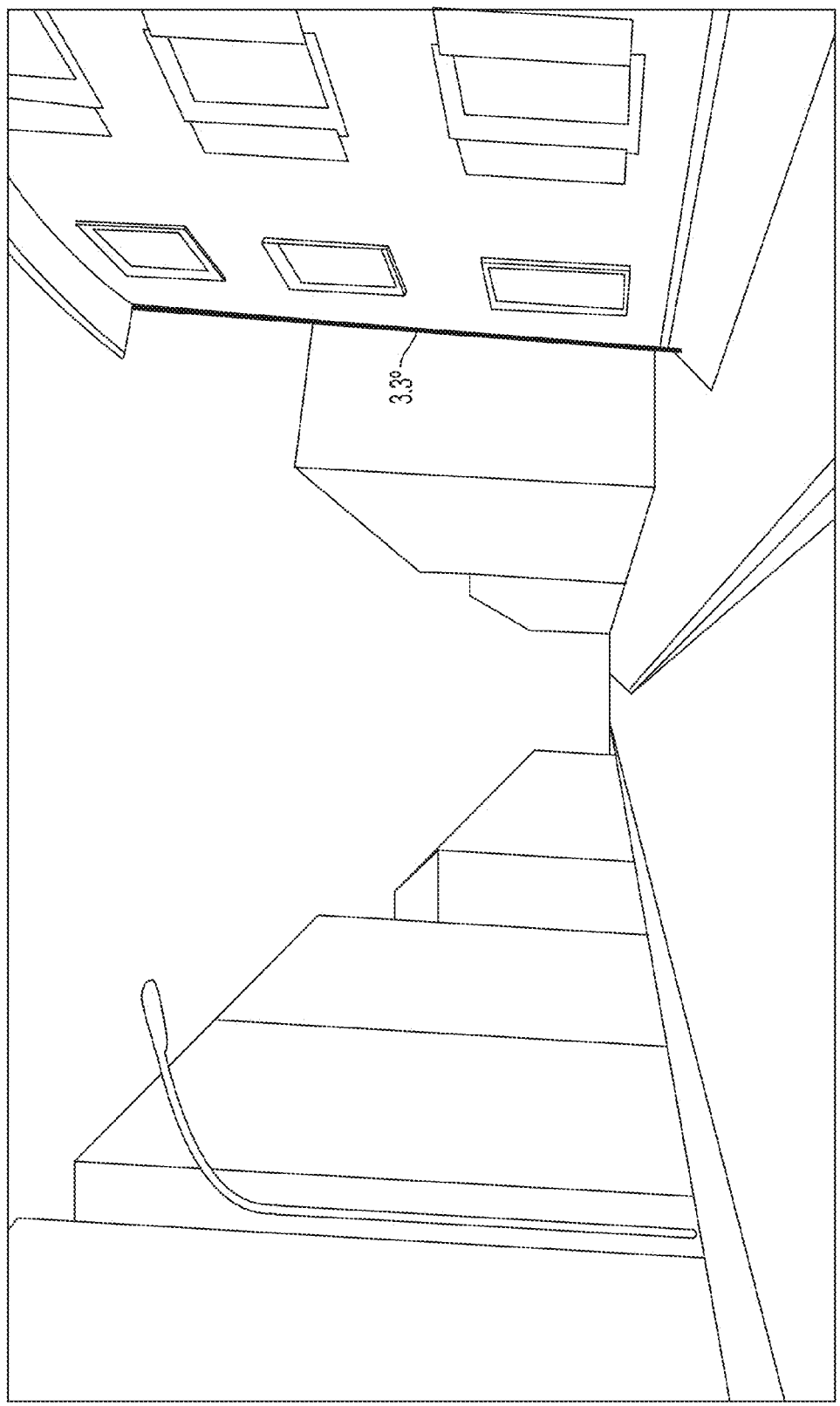

FIG. 3D illustrates the "lens undistorted" image at the left-most position, for which the warping artifact has been reduced and/or removed. FIG. 3E illustrates the "lens undistorted" image at the center position. FIG. 3F illustrates the "lens undistorted" image at the right-most position, for which the warping artifact has been reduced and/or removed. Note that the building on the right-hand side is tilted at −3.9, 0.0 and 3.3 degrees in FIGS. 3D-3E-3F, respectively. By virtue of performing the process referred to as "camera correction," "orientation stabilization," and/or "perspective undistortion" (explained elsewhere in this disclosure), FIGS. 3D-3E-3F are converted/processed/transformed into FIGS. 3G-3H-3I, respectively.

Figure 3G:
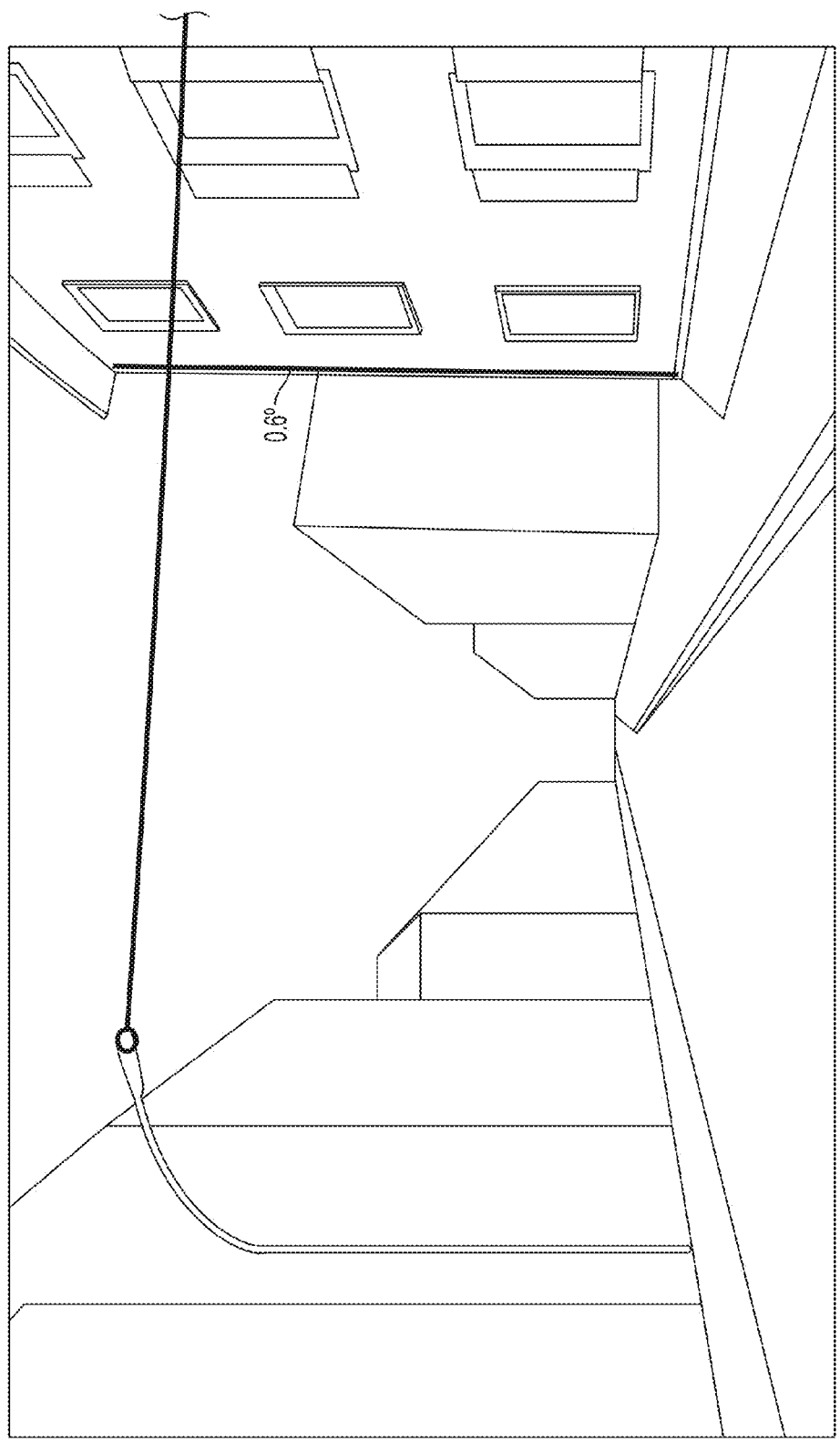
Figure 3H:
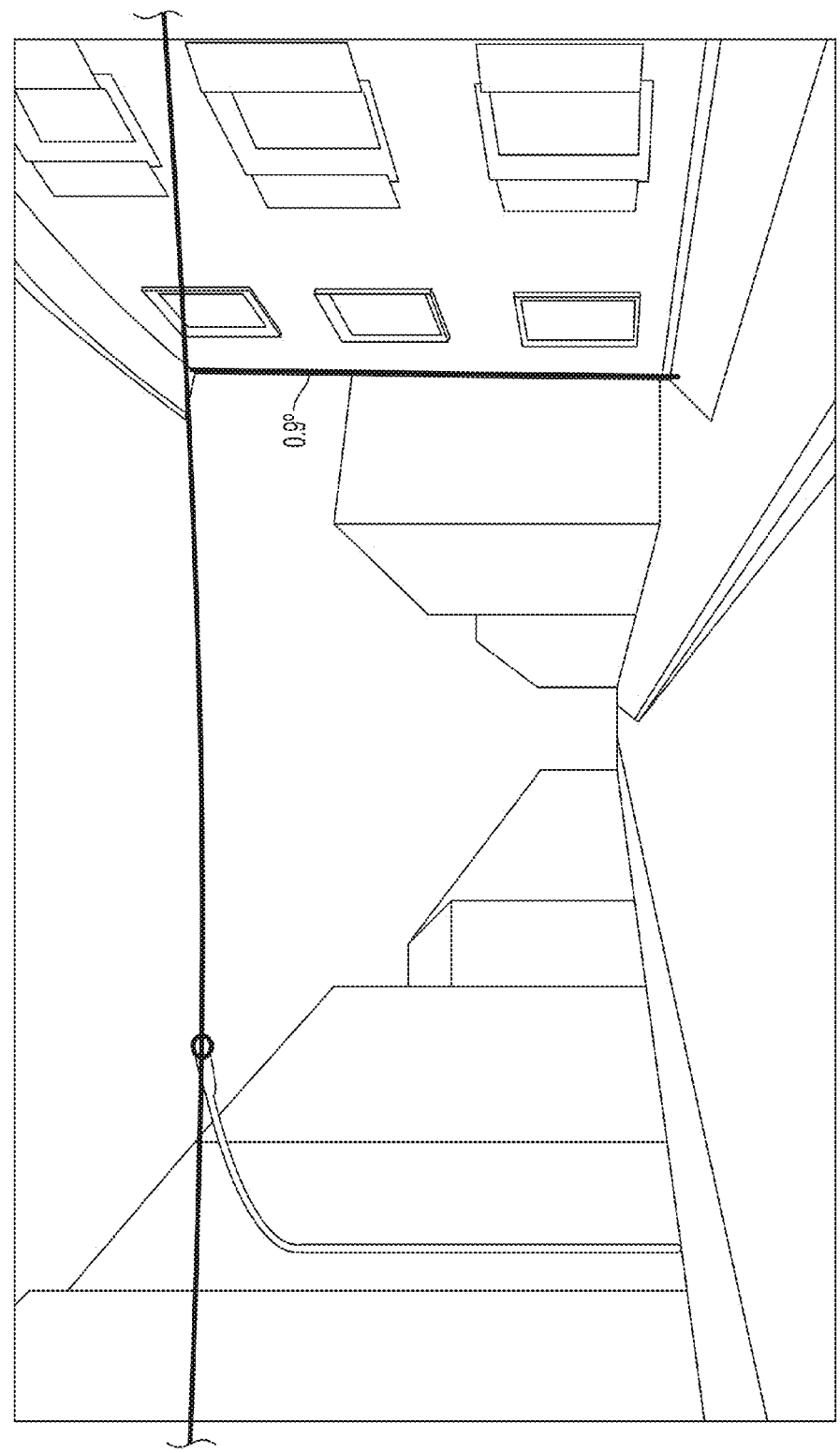
Figure 31:
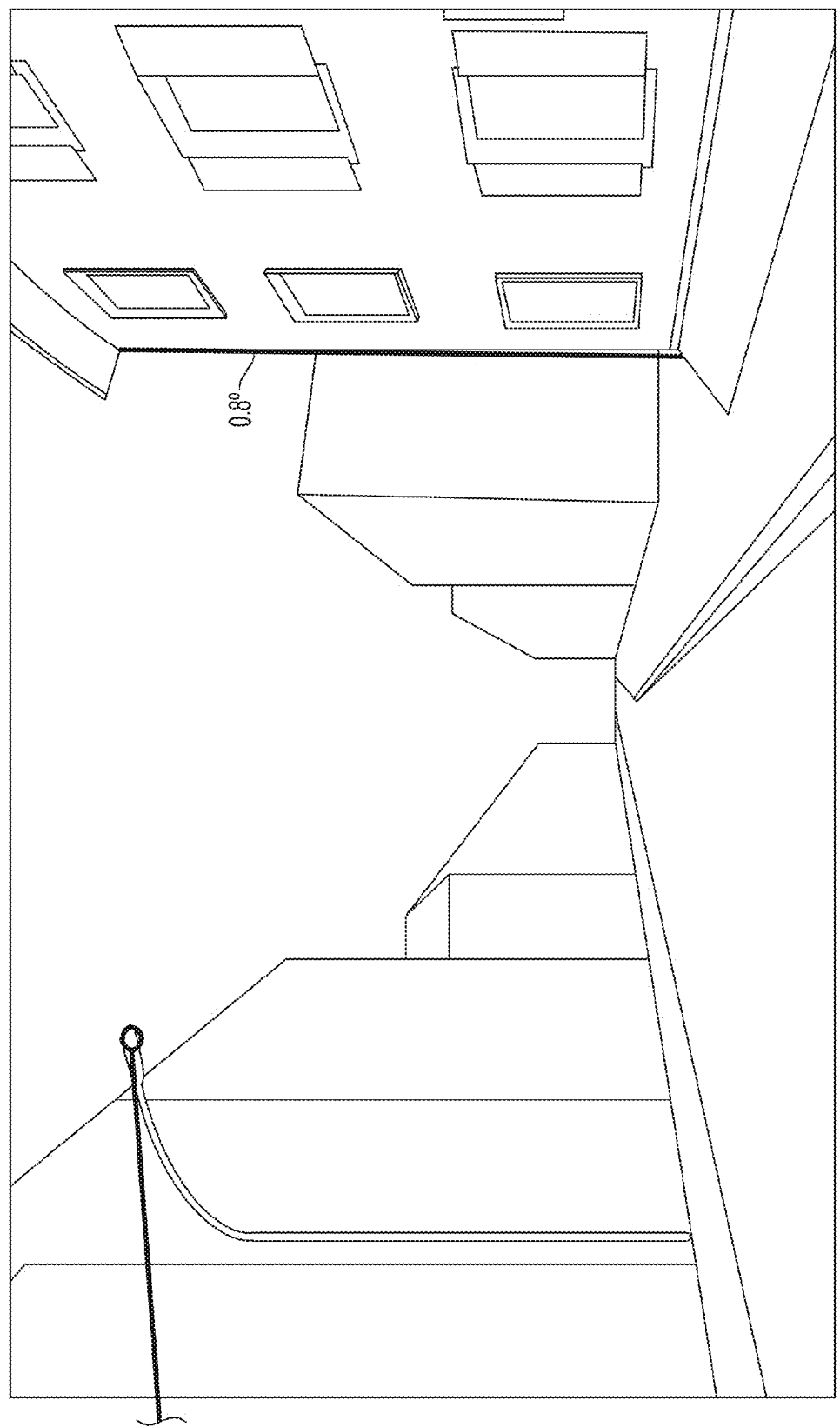

FIG. 3G illustrates the "orientation stabilized" image at the left-most position, for which the tilting artifact has been reduced. FIG. 3H illustrates the "orientation stabilized" image at the center position. FIG. 3I illustrates the "orientation stabilized" image at the right-most position, for which the tilting artifact has been reduced. Note that the building on the right-hand side is tilted at (merely) 0.6, 0.9 and 0.8 degrees in FIGS. 3G-3H-3I, respectively. The vertical line that connects the top of the lampposts in FIGS. 3G-3H-3I has been added to indicate vertical parallax between images. By virtue of "parallax compensation" (explained elsewhere in this disclosure), FIGS. 3G-3H-3I are converted/processed/transformed into FIGS. 3J-3K-3L, respectively.

Figure 3J:
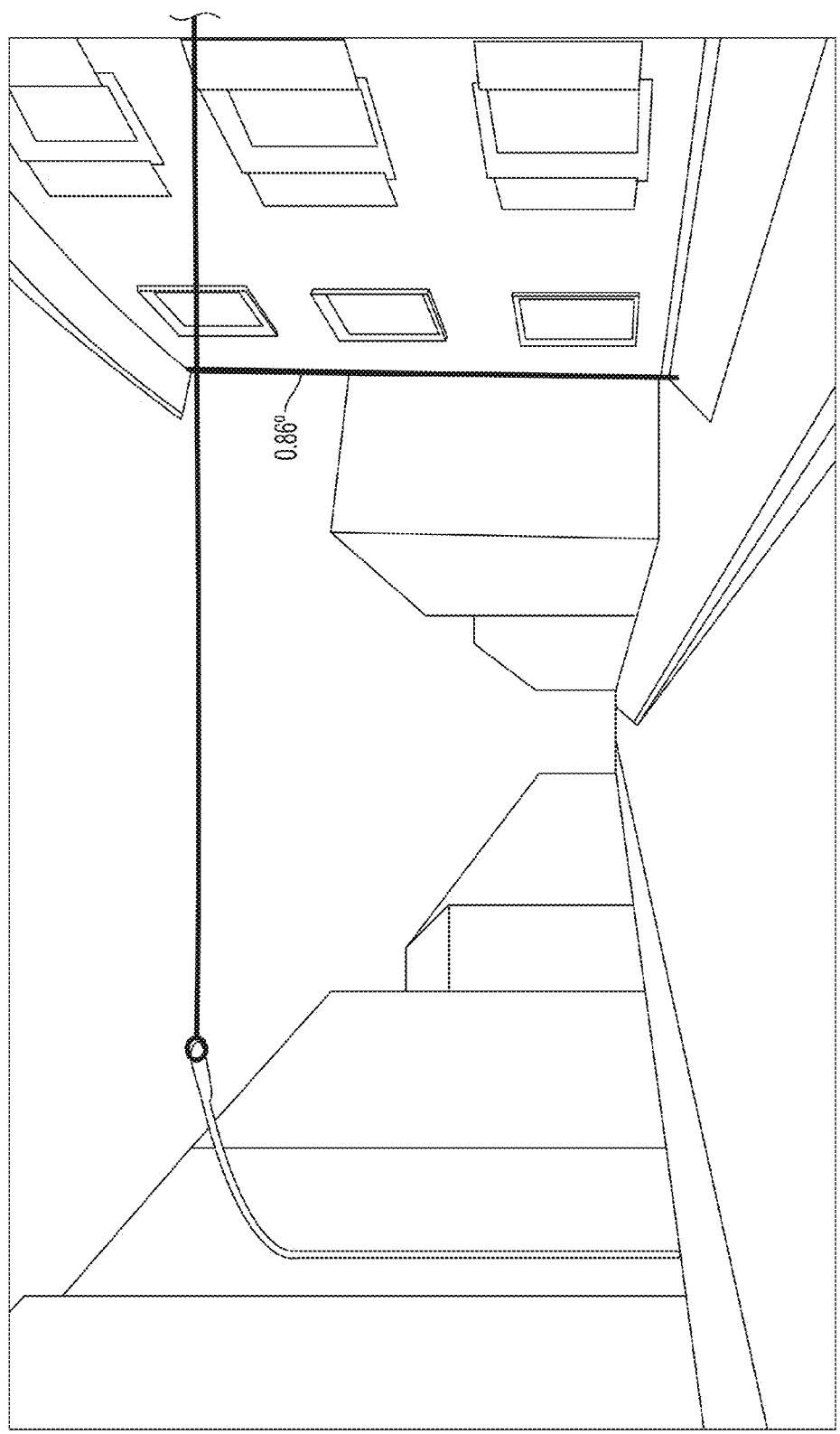
Figure 3K:
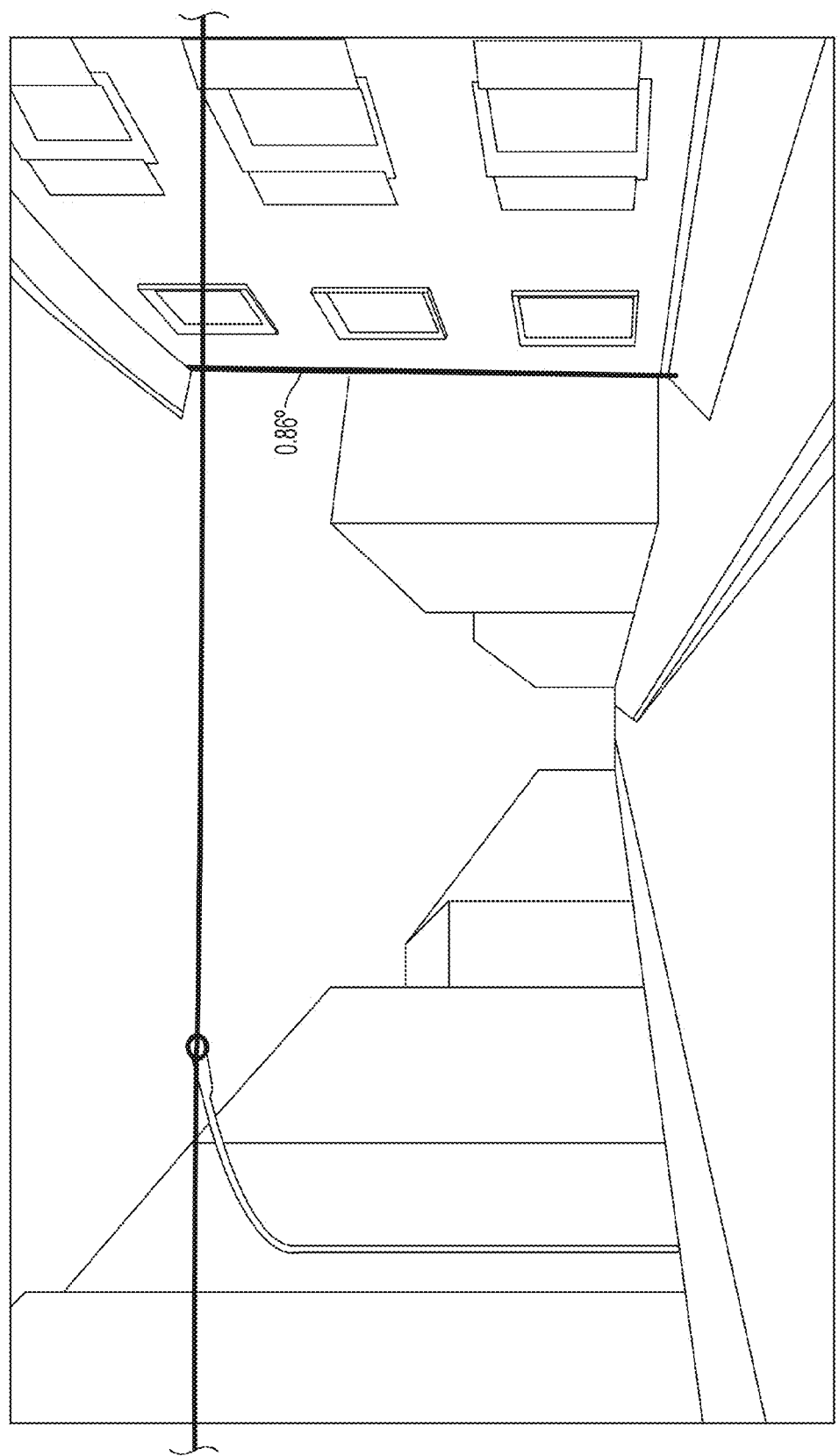
Figure 3L:
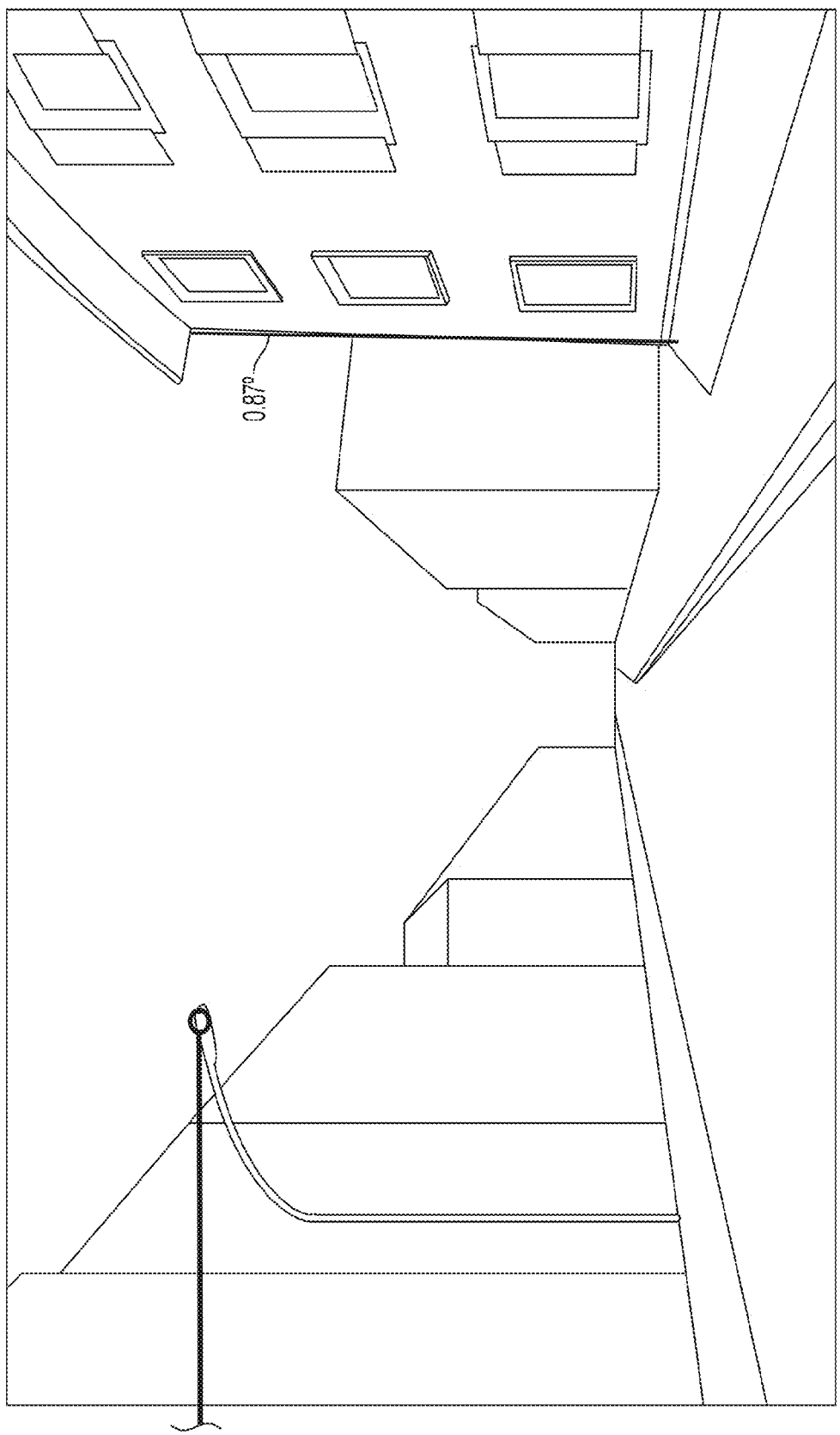

FIG. 3J illustrates the "parallax compensated" image at the left-most position, for which the vertical parallax has been reduced. FIG. 3K illustrates the "parallax compensated" image at the center position. FIG. 3L illustrates the "parallax compensated" image at the right-most position, for which the vertical parallax has been reduced. The vertical line that connects the top of the lampposts in FIGS. 3J-3K-3L has been added to indicate the reduction of vertical parallax between images.

Lens undistortion (e.g. by distortion component 25) may restore rectilinear projection and straight lines. Correction of the camera orientations (e.g. by orientation component 26) may remove perspective distortion. Cylindrical projection (e.g. by vertical parallax component 27) may compensate for vertical parallax. In the standard pinhole model with a planar imaging surface, objects near the image border are larger than near the image center. As a conset, for non-linear camera trajectories, motion parallax between two input views may include a horizontal and a vertical component. While the horizontal component may be desirable for constructing a stereoscopic output image, the vertical component may need to be eliminated in order to allow for proper stereoscopic viewing.

By re-projecting individual ones of the undistorted, orientation-corrected input images onto a cylindrical imaging surface, the vertical parallax may be effectively removed. The cylinder may be defined to be concentric to the circle fitted to the camera centers (as described elsewhere herein), with the cylinder's axis orthogonal to the circle plane and a specific radius. The cylinder radius may determine the amount of horizontal scale changes for objects at different distances. In practice, setting the radius to the approximate distance of salient objects to the camera may provide good results. By virtue of the structure-from-motion (SfM) computation (described elsewhere), system 100 may be configured to provide various opportunities for a user to define those distances interactively and/or automatically from the scene geometry.

To efficiently project an image onto a cylinder, a pixel grid may need to be established on the cylinder at the desired output resolution. Individual pixels may be projected onto the pinhole camera's imaging plane to sample the corresponding output color. Specifically, for individual ones of the images, the extent of the image on the cylinder may be approximated by tracing rays from pixels on the image border through the camera center and intersecting these rays with the cylinder.

In some implementations, the re-oriented, parallax-compensated images may be used for synthesizing an omni-stereo panorama. In some implementations, another processing step, transformation, may provide beneficial results. The remaining relative transformations between the images may be mostly simple horizontal translations without any rotational component. By projecting the images back into a planar 2D setting that is compatible with existing methods for panorama generation the process of stitching together images may be simplified. The alignment information about images may be encoded via homographies. For pairs of consecutive images, the reconstructed camera geometry may be leveraged to calculate the homography induced by a plane tangent to the cylinder halfway between the two camera centers in order to minimize distortions. For general camera trajectories, the plane may be positioned at a fixed distance in front of the midpoint of the two camera centers, with the plane normal halfway between the viewing directions of the two cameras. The plane-induced homography $H_P$ (in normalized camera coordinates) may be decomposed to remove 5 of its 8 degrees of freedom to obtain a Euclidean transform. Specifically, if the chain of transformations may be represented as:

$$H_P = \begin{bmatrix} A & t \\ v^T & \upsilon \end{bmatrix} = \underbrace{\begin{bmatrix} sR & t \\ 0^T & 1 \end{bmatrix}}_{similarity} \underbrace{\begin{bmatrix} K & 0 \\ 0^T & 1 \end{bmatrix}}_{affinity} \underbrace{\begin{bmatrix} I & 0 \\ v^T & \upsilon \end{bmatrix}}_{projectivity}, \quad (1)$$

(Note that the transformations may be represented using similarity, affinity, and projectivity.)

By decompose $sRK=A-tv^T$ using QR decomposition the rotation R may be obtained. The decomposition yields an orthonormal matrix Q* and an upper-triangular matrix R*. R may be obtained by inverting the columns of Q* with negative diagonal entries to restrict the rotation to less than ±90°. Compared to purely image-based alignment techniques, the correction and alignment steps as described herein may reduce the accumulation of positional errors (drift) in panoramas.

In Table 1 (FIG. 7), both the rotational and vertical drift corresponding to different approaches are compared. The approaches described herein may reduce drift in all or most cases by at least two orders to an unnoticeable 0.1°. As depicted in Table 1, rotational drift between both ends of a panorama, and remaining vertical drift after cancellation of rotational drift, may be compared between an image-based (IB) approach and the approach described herein, which includes virtually no drift.

Stitching an omni-stereo panorama may be accomplished by extracting specific strips from each input image—dependent on the desired stereoscopic output disparities—and by combining the strips into a left and right output view. The omni-stereo effect may be achieved by collecting rays that are tangent to a common viewing circle, as illustrated in FIG. 4.

Proper capturing and/or sampling of input rays and/or images for the generation of a stereo panorama may depend on the targeted output resolution. In some implementations, strips from input views or images may project to less than a pixel's width in the output image, thereby avoiding aliasing artifacts and deviation of rays from the desired ray projection. The deviation angles may be defined as the angular difference between the ideal ray and the ray that is used for stitching (see angles α1, α2 in FIG. 4). The output quality may depend on the angular resolution of the capture setup, i.e. the number of input views rather than their spatial resolution. With a coarser angular resolution the deviation angles grow (approximately inversely proportional to the angular resolution) and stitching artifacts such as discontinuities, duplications, and truncations of objects may become apparent.

Figure 8:
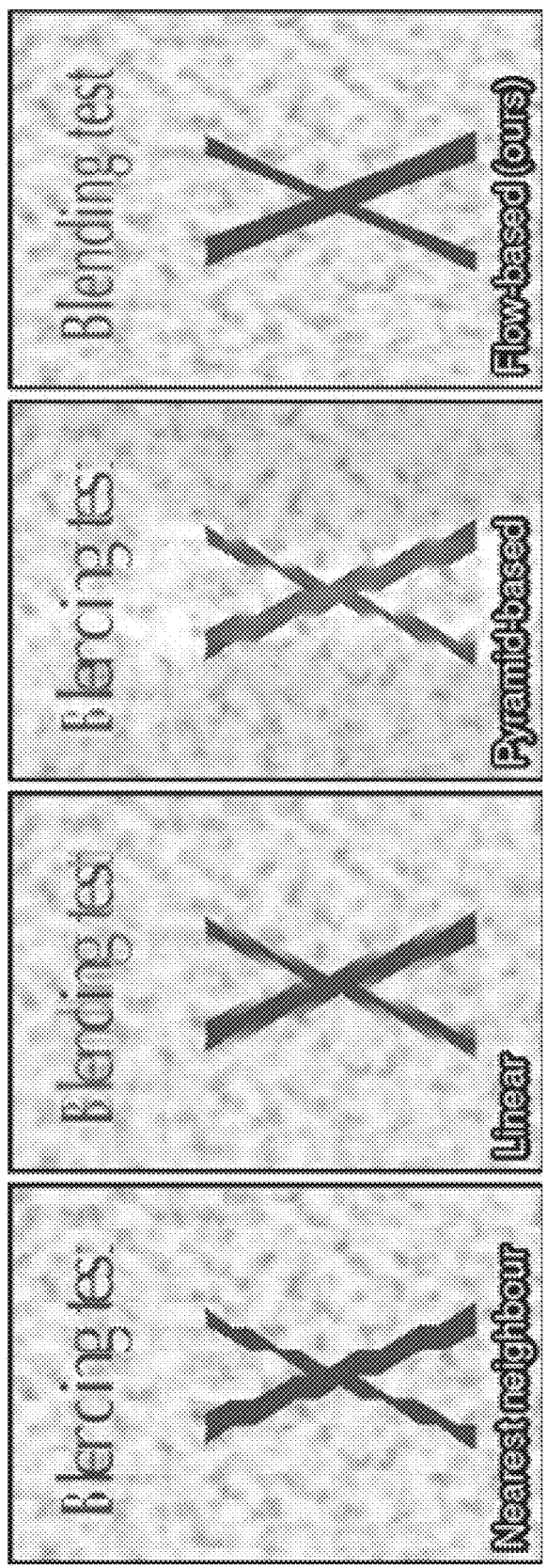
FIG. 8 illustrates visual artifacts that may result from existing blending approaches.

Artifacts may be reduced through various forms of blending. FIG. 8 illustrates that some blending approaches may obscure artifacts, to some extent, without addressing the problem at its core. From left to right, FIG. 8 illustrates the results for "nearest neighbor" blending, linear blending, pyramid-based blending, and flow-based blending (which is explained in more detail elsewhere in this disclosure). Capturing enough input images for an angular resolution of less than 0.05° may lead to prohibitive memory requirements, orders of magnitude higher than the approach described in this disclosure. By virtue of the disclosed techniques, angular resolutions from 0.1°, 0.5°, 1°, 2°, 3°, 4°, 8°, and/or other angular resolutions may result in a high-quality panorama that is virtually artifact-free.

In order to characterize the aliasing artifacts, consider FIG. 5. Given two images $I_K$ and $I_L$, the rays may need to be collected at an angle β to the principal axis. Let E and G be the intersections of these projected rays with the cylinder. Filling the strip EG in the panorama will in general require additional nearby rays to compensate for the relatively coarse angular resolution between input images. An object at distance $d_{far}$ from the rotation center may be further away than the cylindrical projection. The section C D (in the tree) will be duplicated in the stitched output since its projections c' and d' as well as c" and d" from images $I_K$ and $I_L$, respectively, to the cylinder are visible in both the green and the red strip. On the other hand, objects in the range A B at distance $d_{near}$ may appear truncated in the final panorama.

These aliasing artifacts may be resolved by generating the missing rays using optical flow-based up-sampling, as illustrated in FIG. 6, e.g. by up-sampling component 23. A point P at distance $d_{far}$ is projected to p' and p" from images $I_K$ and $I_L$, respectively, to the cylinder. The optical flow vector F at point p' maps to point p" as p'+F(p')=p". To avoid stitching artifacts, the intermediate point p̃ between p' and p" may be interpolated, effectively synthesizing missing rays at the virtual camera location $\widetilde{I_u}$. The same concept may apply to points closer than the cylindrical projection surface, as well as to other camera trajectories like the ones used for street view panoramas.

In some implementations, system 100 may be configured to use pairwise optical flow. For a simplified notation, the flow-based ray up-sampling may be described using the corrected images. However, system 100 may be configured to compute the flow directly on the input images, which thereby undergo the same correction transformations.

Denote the flow fields between pairs of adjacent images k and l by $F_{k\_l}$. This provides image correspondences, i.e. $I_k(x) \approx I_L(x+F_{k\_l}(x))$, where both images and the flow field are defined on the same pixel grid. However, this assumption may be violated by the alignment described elsewhere herein, which aligns all images to the same global coordinate frame, with a different pixel grid for each image.

System 100 may be configured to compensate for the global alignment. This compensation may be performed prior to using the flow fields to interpolate missing rays. The flow field $F_{k\_l}$ is defined on the pixel grid of $I_k$, and consequently it is sampled in the coordinate frame of image k, at $x_k = A_{0 \to k} x$, where $A_{0 \to k}$ transforms from global coordinates to the local coordinate system of $I_k$. The flow field may also encompass the Euclidean motion which is already accounted for by aligning the images in global space. This motion is given by $A_{0 \to L} x - A_{0 \to k} x$, which leads to the definition of the motion-compensated net flow as $$F^*_{K \to L}(x) = F_{K \to L}(A_{0 \to k} x) - (A_{0 \to L} x - A_{0 \to k} x). \quad (2)$$

Figure 9:
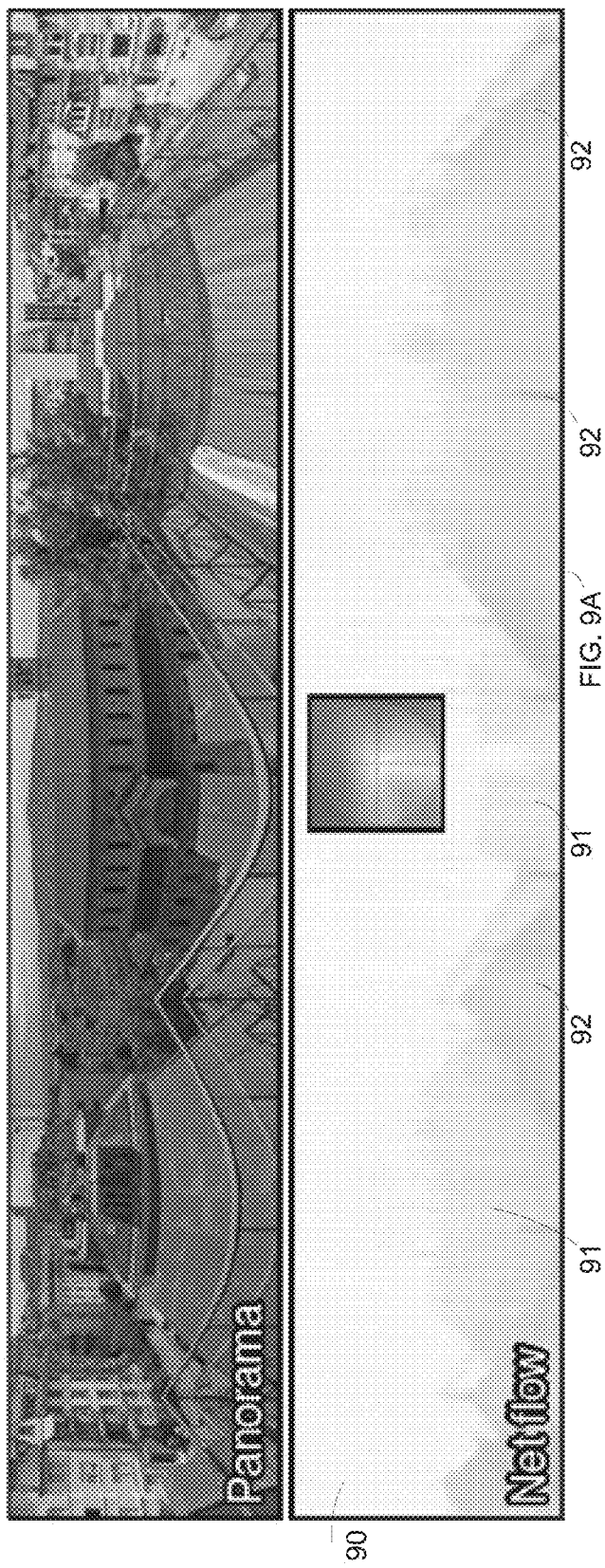
FIG. 9-9A illustrate the stereoscopic panorama of FIG. 1 and its associated net flow diagram.
Figure 9A:
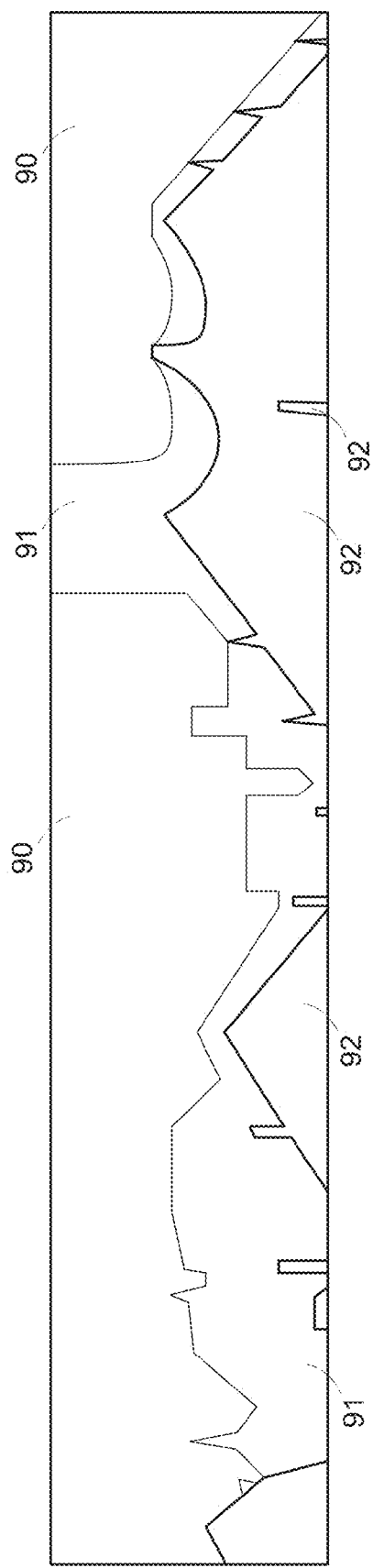

An example for the resulting net flow is shown in FIG. 9 (and additionally in FIG. 9A). The top-half of FIG. 9 illustrates a similar panorama as depicted in FIG. 1. The bottom half depicts the computer net flow for the image in the top half. Objects at greater distance from the camera, such as the buildings in FIG. 9, may have little or no net flow, as depicted by white or near-white sections (labeled 90) in the bottom half of FIG. 9 and in FIG. 9A. Objects at a medium distance from the camera, such as certain sections of the fence or gate in FIG. 9, may have a small net flow, as depicted by lightly-shaded sections (labeled 91) in the bottom half of FIG. 9 and in FIG. 9A. Objects close to the camera, such as certain parts of the fence or gate in FIG. 9, may have a (relatively) large net flow, as depicted by more darkly shaded sections (labeled 92) in the bottom half of FIG. 9 and in FIG. 9A.

The desired interpolation to synthesize in-between light rays on the fly may be achieved by warping corresponding pixels by a fraction of the flow, depending on the horizontal angular interpolation factor η between two images. Linearly blending between the two warped images k and l dependent on η may produce the flow-based blending result as $$S_k^{Flow}(x) = (1 - \eta) \cdot I_k(A_{0 \to k} x + \eta \cdot F^*_{k \to l}(x)) + \quad (3)$$
$$\eta \cdot I_l(A_{0 \to l} x + (1 - \eta) \cdot F^*_{l \to k}(x)).$$

This type of blending may degrade gracefully in cases where the flow estimation shows inaccuracies.

The described techniques may require querying the two images at some warped sub-pixel locations of the form $x + \eta \times F^*$, which can easily and efficiently be implemented on a graphics processing unit (GPU) using texture lookups. The flow-based blending may be accomplished without computational overhead during rendering. In some implementations, the flow fields may be pre-computed.

Figure 10:
FIGS. 10-11 illustrate examples of rotational and vertical drift under different approaches.
Figure 11:

By virtue of the described techniques in this disclosure, system 100 may be configured to stitch the panoramas in real-time at full screen resolution, which gives the user the freedom to adapt important stereo viewing parameters like interaxial distance or vergence on the fly. Furthermore, as illustrated by comparing FIG. 10 and FIG. 11, system 100 may be configured to obtain clean and linear results, e.g. by removing rotational and vertical drift.

Figure 12:
FIGS. 12, 12A-12C illustrate examples having strong parallax under different (alignment) approaches.
Figure 12A:
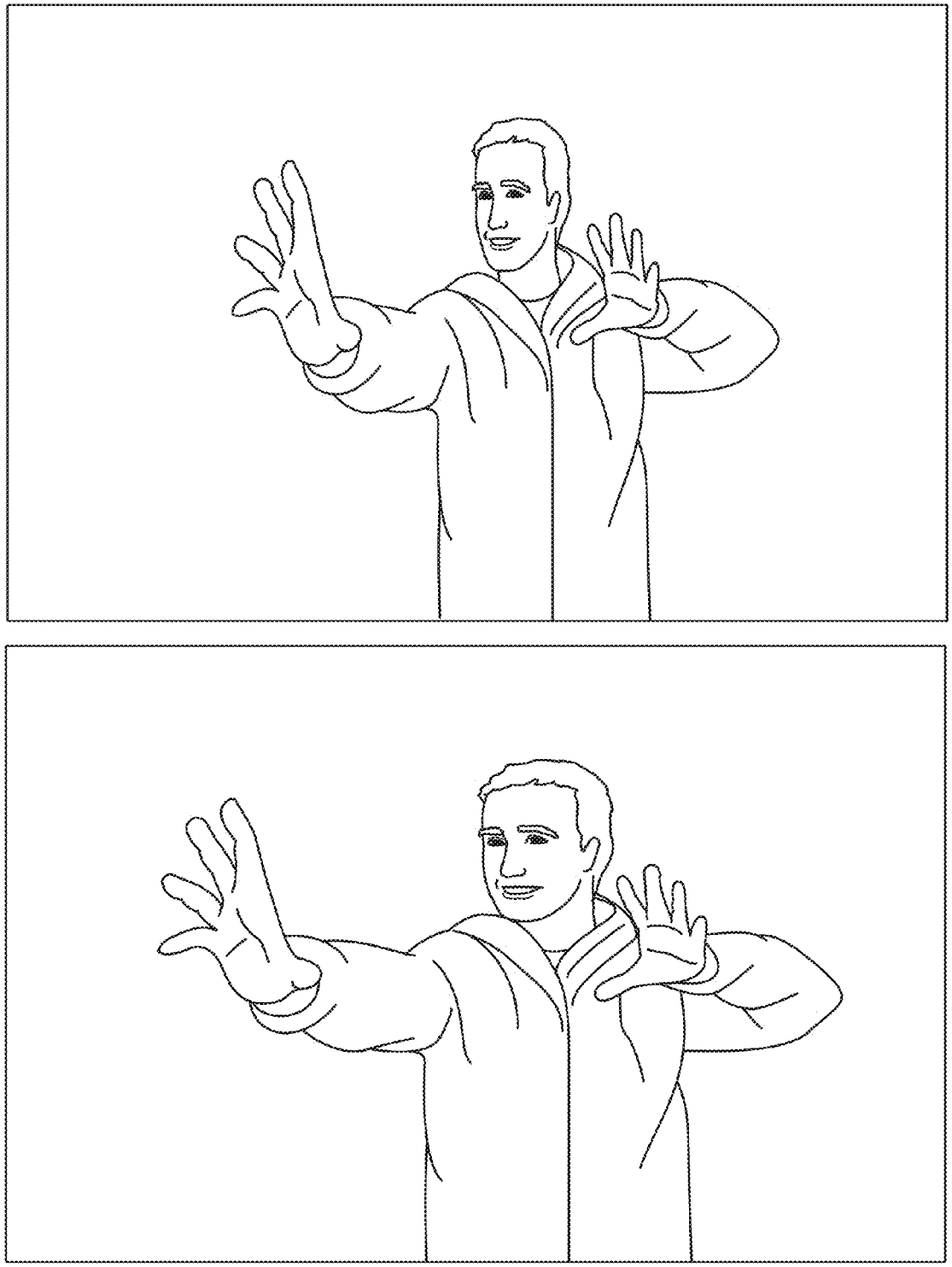
Figure 12B:
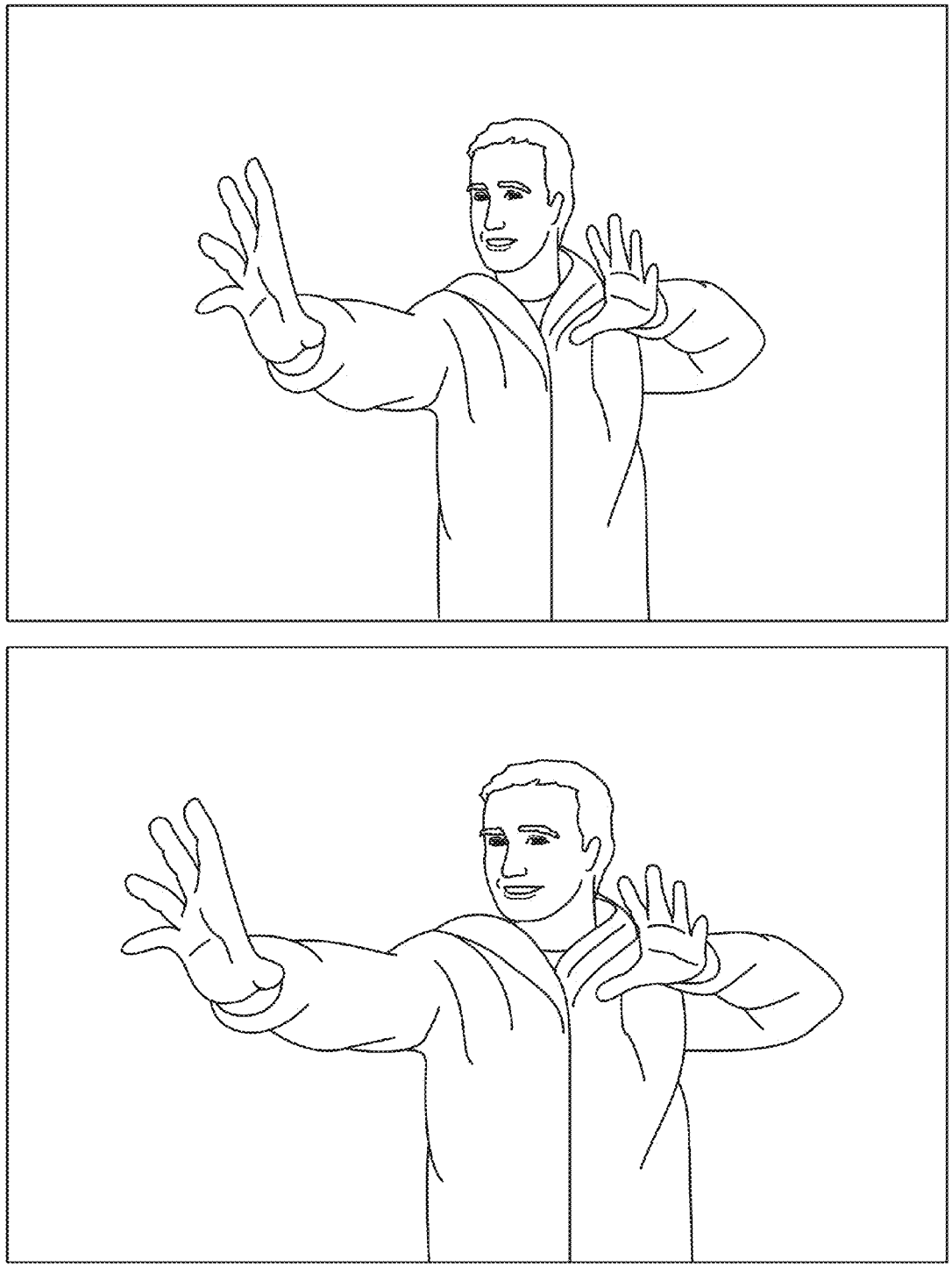
Figure 12C:
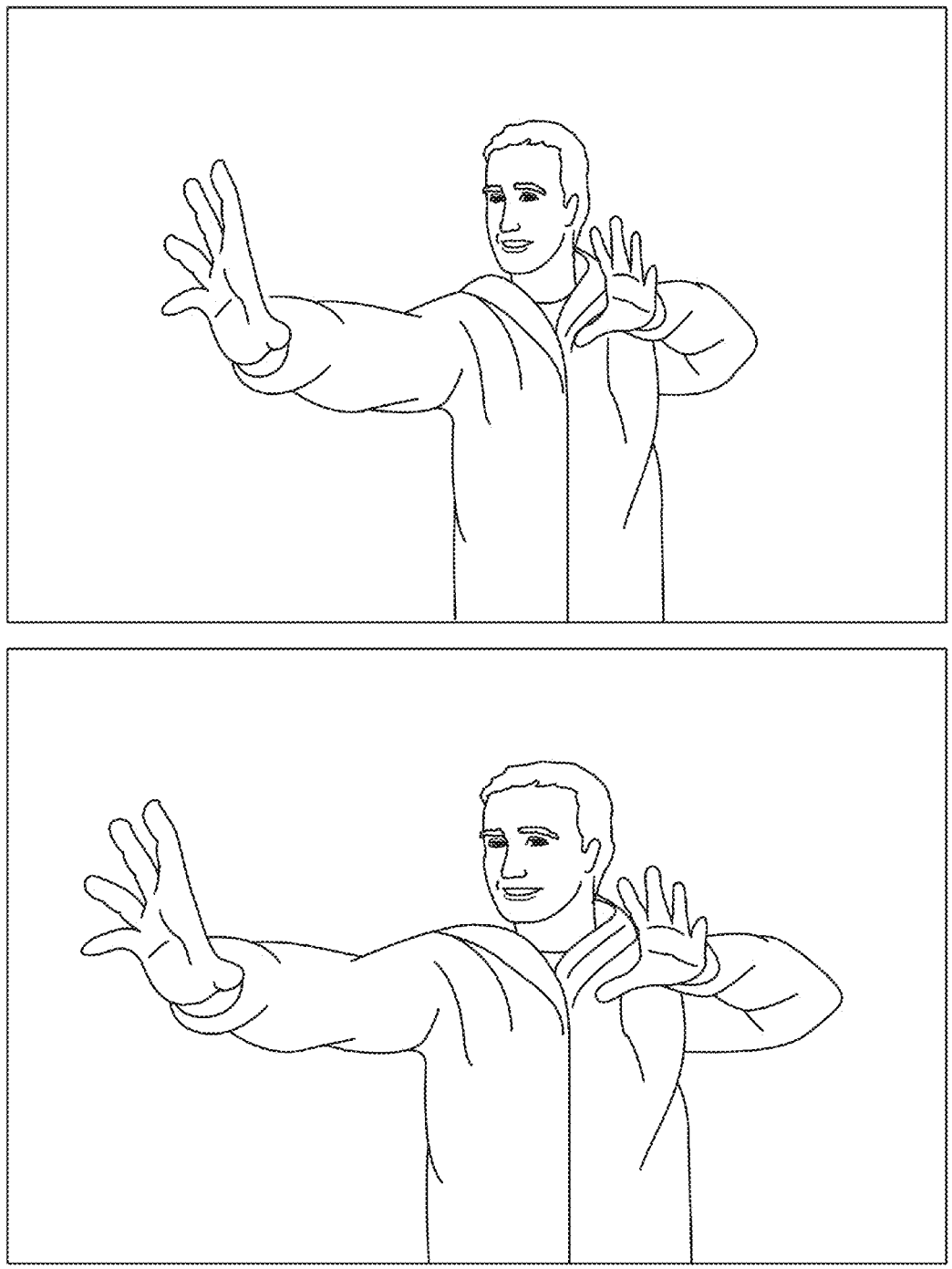

FIG. 12 illustrates an example with very strong parallax caused by a person standing close to the camera. Here, it becomes clear that purely image-based (alignment) strategies lead to severe shape distortions, whereas the techniques described in this disclosure produce a high-quality result without distortions. The images in the top row have been produced using image-based alignment of images captured at three positions: the right-most position (FIG. 12C), the center position (FIG. 12B), and the left-most position (FIG. 12A). The images in the bottom row of FIG. 12 have been produced using the alignment described in this disclosure. FIGS. 12A-12B-12C are line-drawings that represent the left-most, center, and right-most column in FIG. 12, respectively. The distortion and parallax artifacts in the top half of each of FIGS. 12-A-12B-12C is clear, especially in comparison with the bottom half of the same figures.

Figure 13:
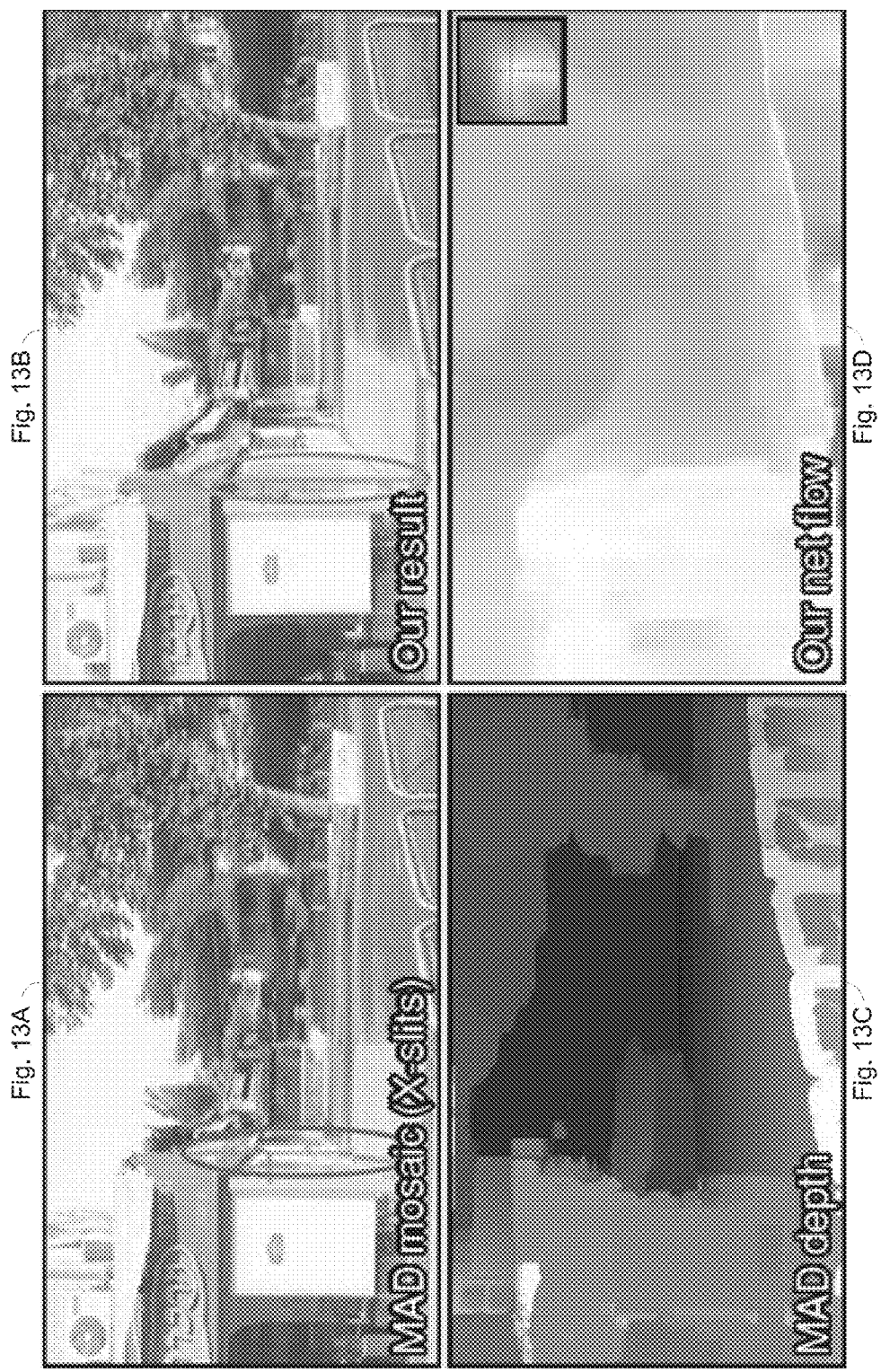
Figure 13B:
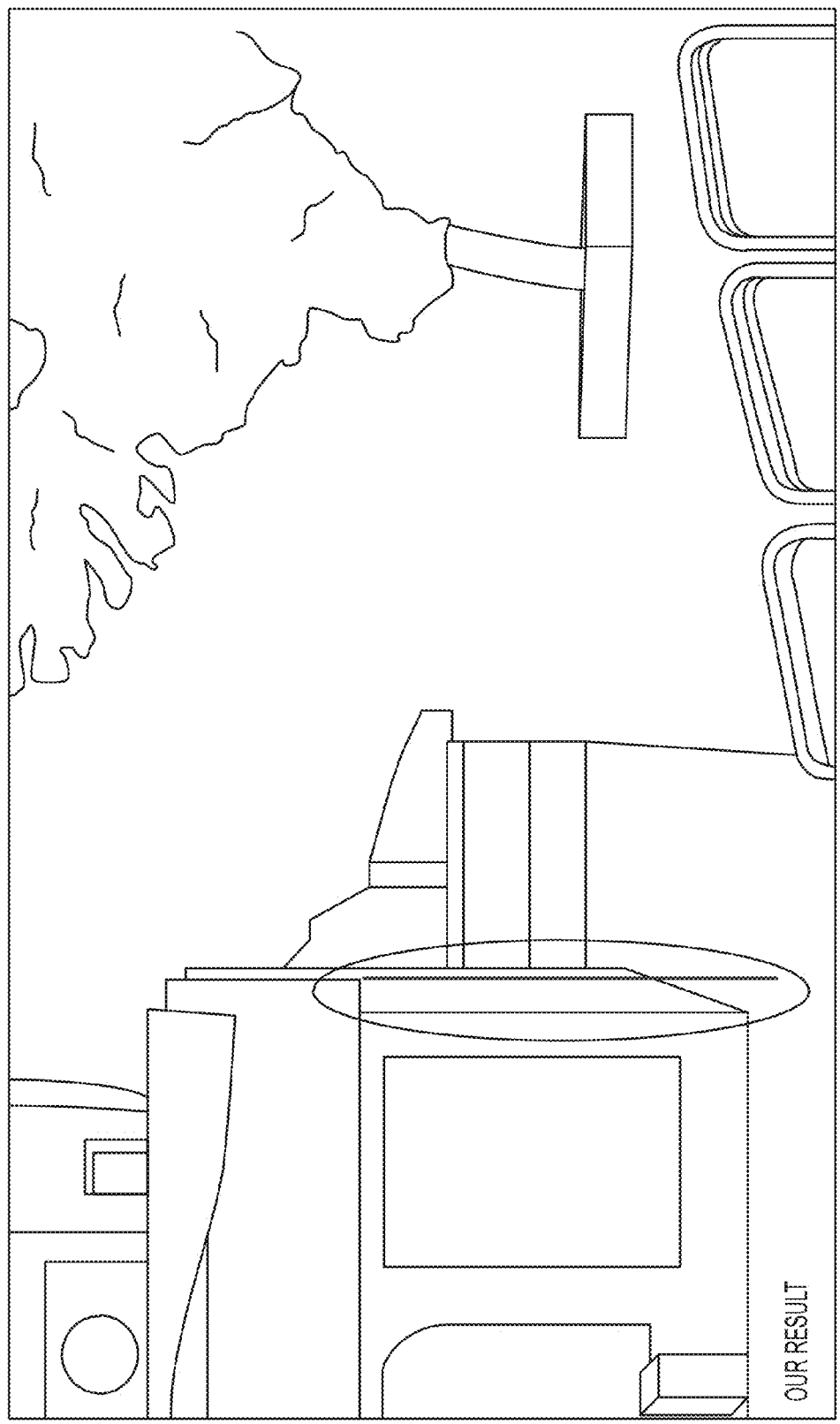
Figure 13C:
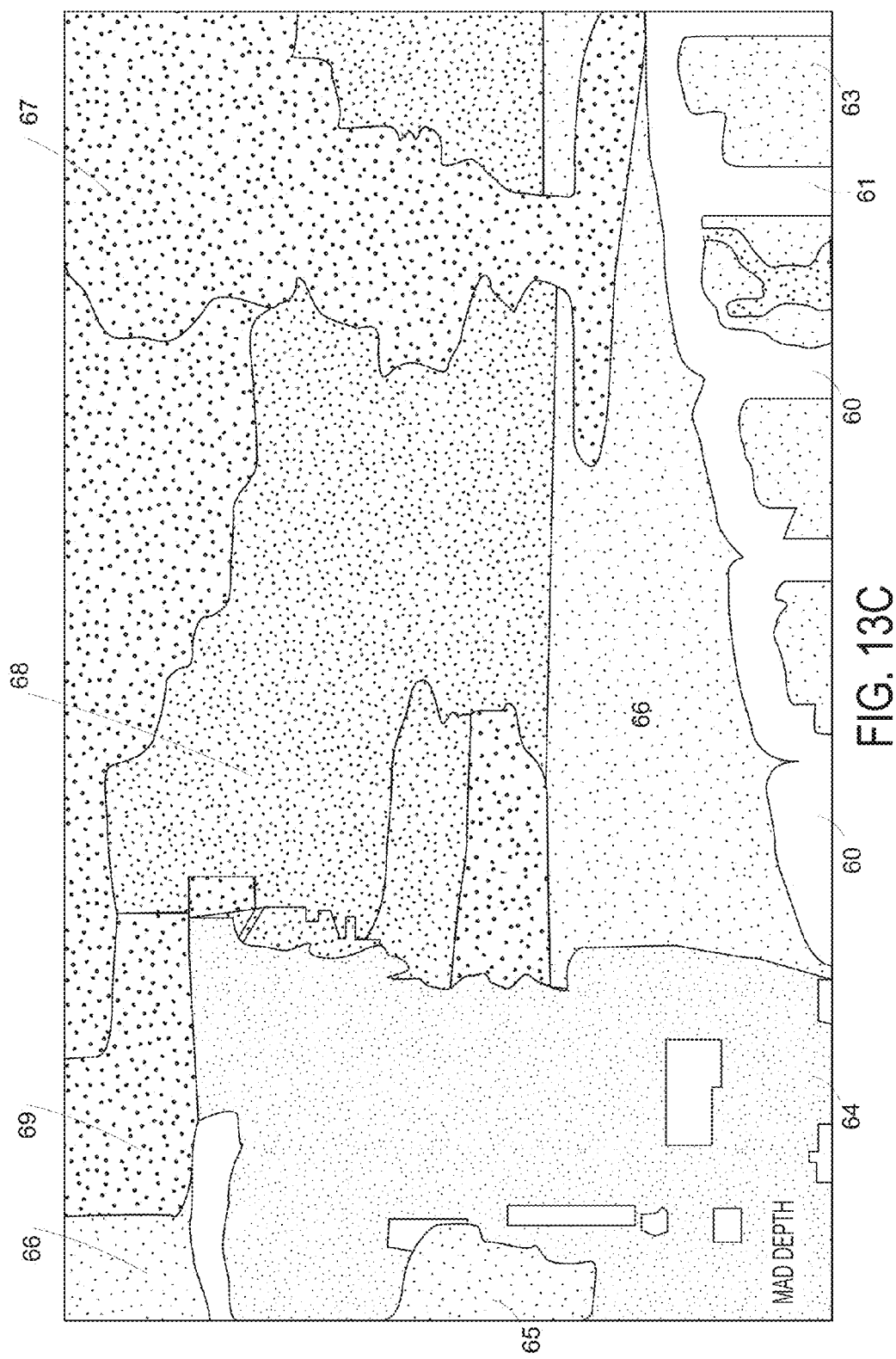
Figure 14A:
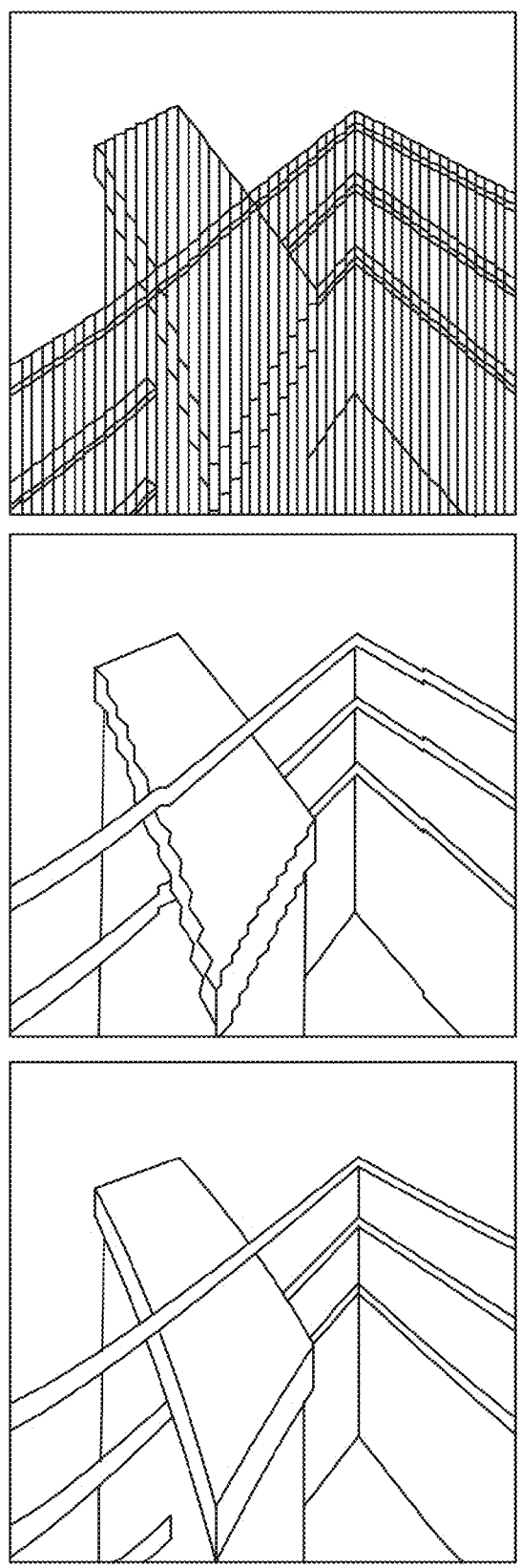
Figure 14B:
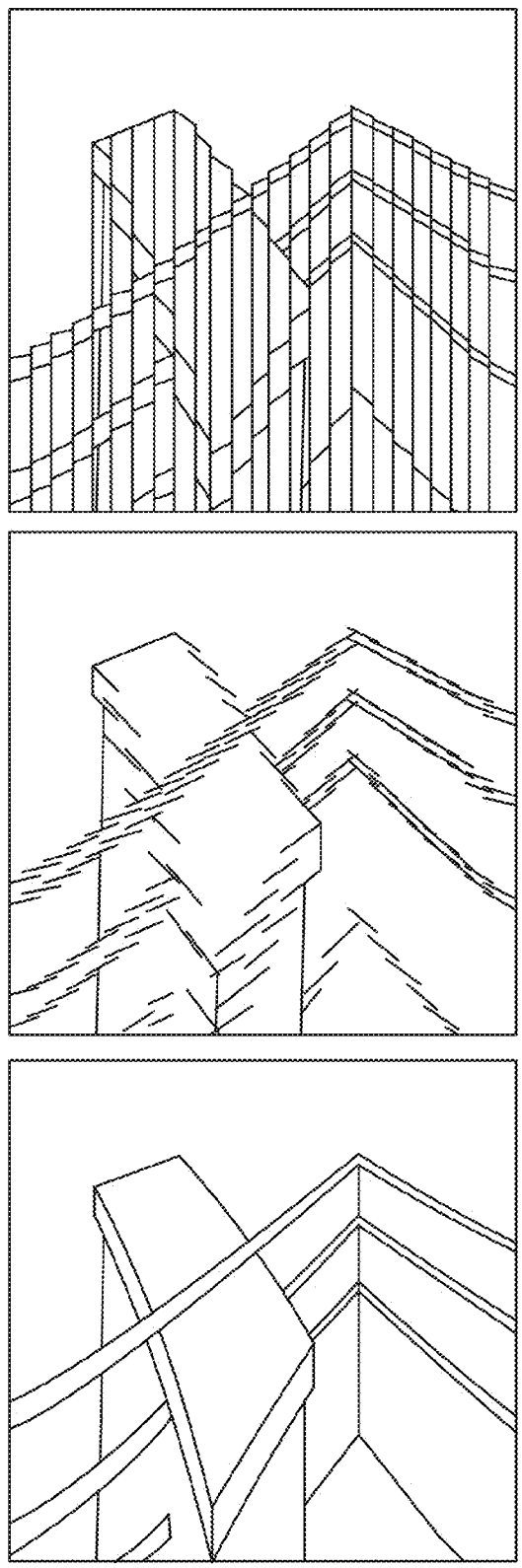
Figure 14C:
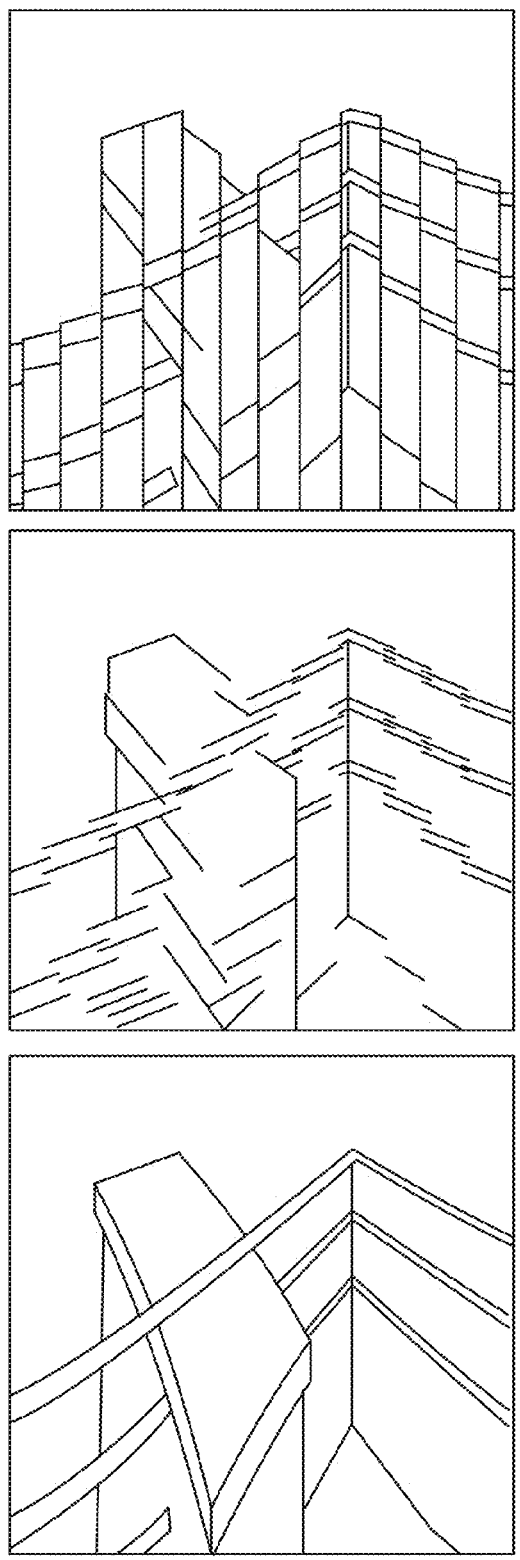
Figure 14D:
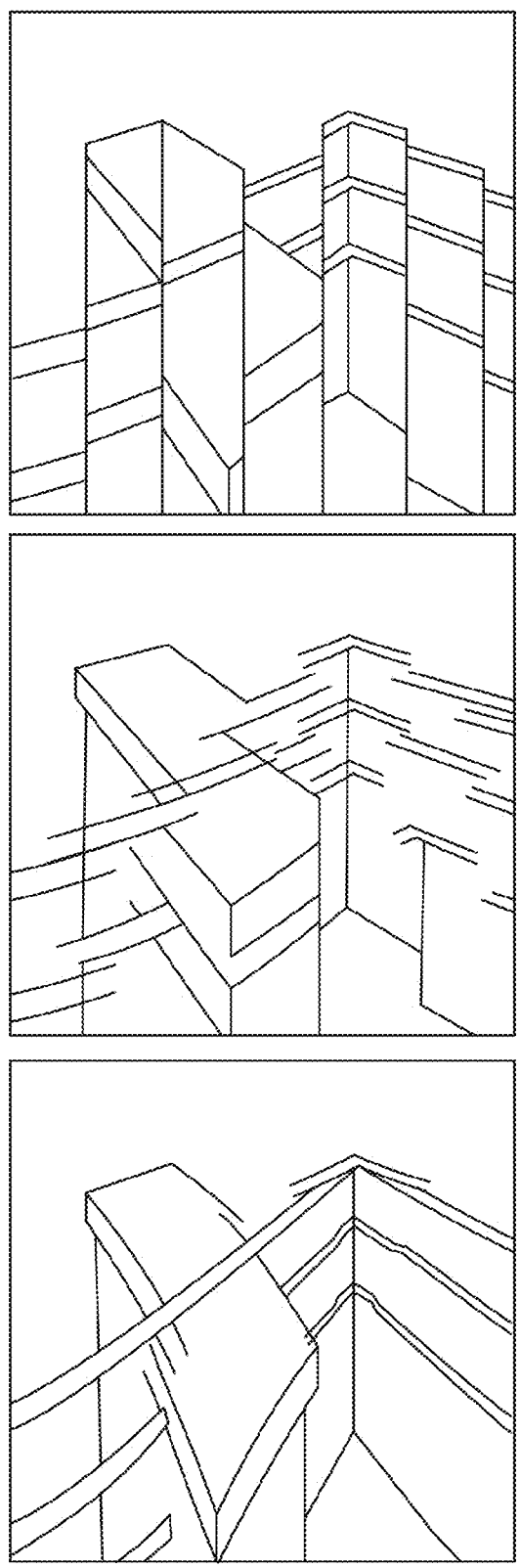

FIG. 13 illustrates an example with thin (vertical) structures and linear blending. Note that these results are actually not stereo panoramas, but linear pushbroom images as the input was captured from a car driving along the street. Note the fence in the foreground. FIG. 13 illustrates that the disclosed techniques may be applied for this type of input. The top-left image (FIG. 13A) illustrates the result for minimal aspect distortion (MAD) mosaicing of the captured input (using crossed-slit projection). Note the visual artifact that is emphasized with an oval shape. The bottom-left (FIG. 13C) illustrates the depth (camera distance) for the top-left image, in which nearby objects are light or lighter and faraway objects are dark or darker. In FIG. 13C, nearby objects are labeled 60, the furthest objects/sections are labeled 69, and objects/sections in-between are correspondingly labeled numerically in-between 60 and 69. The top-right image (FIG. 13B) illustrates the result for applying the techniques described in this disclosure. A similar oval shape emphasizes a reduction in the visual artifact for a thin vertical structure. FIG. 13D illustrates the net flow for image 13B. The net flow at or below dotted line 70 ranges between a small net flow (indicated by light shading and/or a label of 71) to a medium net flow (indicated by medium shading and/or a label of 72) to a relatively larger net flow (indicated by darker shading and/or a label of 73). The net flow above dotted line 70 has the opposite direction as the net flow below dotted line 70. The net flow above dotted line 70 ranges between a small net flow (indicated by light shading and/or a label of 75) to a medium net flow (indicated by medium shading and/or a label of 76) to a relatively larger net flow (indicated by darker shading and/or a label of 77).

FIG. 15 illustrates examples of circular and linear stereoscopic panoramas. Stereoscopic panoramas corrected and stitched using the described techniques herein are shown as red-cyan anaglyph images. The top-left section of FIG. 15 is FIG. 15A. The top-left section of FIG. 15 is FIG. 15B. The bottom-left section of FIG. 15 is FIG. 15C. The bottom-right section of FIG. 15 is FIG. 15D (a linear panorama).

FIG. 14 illustrates flow-based blending (bottom row) using under-sampled input. As shown, other blending methods (including nearest neighbor blending in the top row and linear blending in the center row) may fail (e.g. show visual artifacts, including but not limited to aliasing, duplication, and/or blending artifacts) in these scenarios. The left-most column (FIG. 14A) represents results from images captures at 1 degree intervals. The columns next to the left-most column, from left to right, represent 2, 4, and 8 degree intervals, respectively (depicted by FIGS. 14B-14C-14D respectively). Visual artifacts are worse for larger intervals, so gradually get worse from the left-most to the right-most column.

Referring to FIG. 16, electronic storage 50 may comprise electronic storage media that electronically stores information. The functionality of electronic storage 50 may be similar between different instantiations, even if the stored information may be different. Electronic storage 50 may be configured to store captured images, pre-processed images, pre-processed information, interpolated images, generated panoramas, and/or other information. The electronic storage media of electronic storage 50 may include one or both of system storage that is provided integrally (i.e., substantially non-removable) and/or removable storage that is removably connectable via, for example, a port (e.g., a USB port, a firewire port, etc.) or a drive (e.g., a disk drive, etc.). Electronic storage 50 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 50 may include one or more virtual storage resources (e.g., cloud storage, a virtual private network, and/or other virtual storage resources). Electronic storage 50 may store software algorithms, information determined by processor(s) 110, information received from components of system 100, and/or other information that enables system 100 to function as described herein.

Processor(s) 110 may be configured to provide information processing capabilities in system 100. The functionality of processor(s) 110 may be similar between different instantiations, even if the processing capabilities may be different. Processor(s) 110 may include one or more of a digital processor, an analog processor, a digital circuit designed to process information, an analog circuit designed to process information, a physical processor, and/or other mechanisms for electronically processing information. Although processor(s) 110 is shown in FIG. 16 as a single entity, this is for illustrative purposes only. In some embodiments, processor(s) 110 may include a plurality of processing units. These processing units may be physically located within the same device, or processor(s) 110 may represent processing functionality of a plurality of devices operating in coordination. The processor(s) 110 may be configured to execute components 22-28, and/or other components, modules, and/or code devices. Processor 110 may be configured to execute components 22-28, and/or other components by software; hardware; firmware; some combination of software, hardware, and/or firmware; and/or other mechanisms for configuring processing capabilities on processor(s) 110.

It should be appreciated that although components 22-28 are illustrated in FIG. 16 as being co-located within a processing unit, one or more of components 22-28 may be located remotely from the other components. The description of the functionality provided by the different components 22-28 described herein is for illustrative purposes, and is not intended to be limiting, as any of components 22-28 may provide more or less functionality than is described. For example, one or more of components 22-28 may be eliminated, and some or all of its functionality may be provided by other ones of components 22-28. As another example, processor 110 may be configured to execute one or more additional components that may perform some or all of the functionality attributed herein to one of components 22-28. The order in which operations and/or functionality attributed to different components is ordered and/or organized is not intended to be limited in any way, and any such order is envisioned within the scope of this disclosure.

Figure 17:
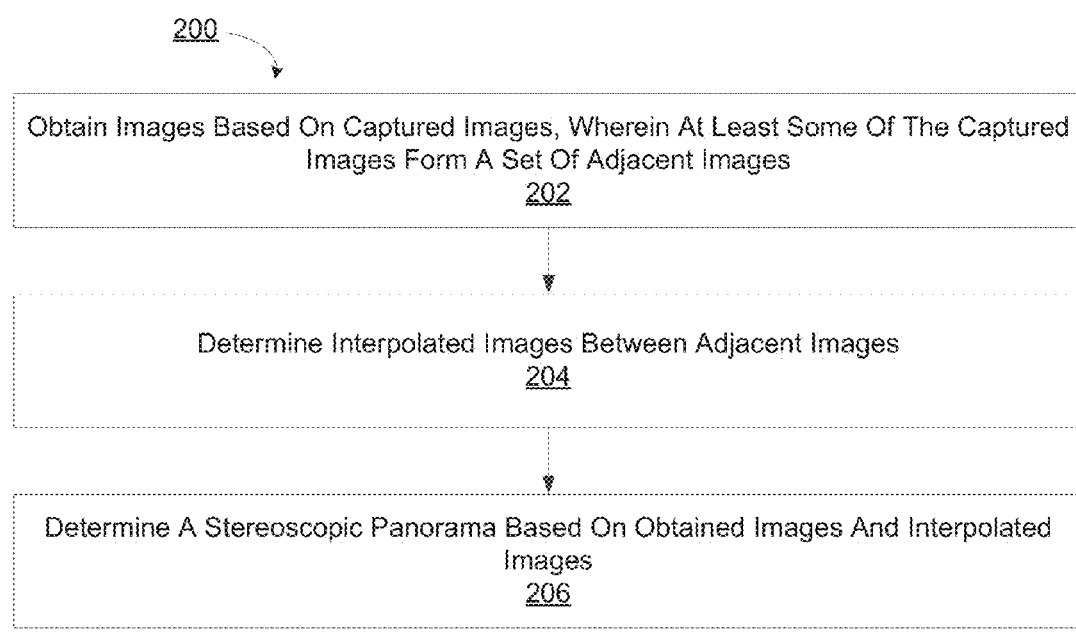
FIG. 17 illustrates a method for generating stereoscopic panoramas, in accordance with one or more embodiments

FIG. 17 illustrates a method 200 for generating stereoscopic panoramas, in accordance with one or more embodiments. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 17 and described below is not intended to be limiting.

In some embodiments, method 200 may be implemented in one or more processing devices (e.g., a digital processor, an analog processor, a controller, a digital circuit designed to process information, an analog circuit designed to process information, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, images based on captured images are obtained. At least some of the captures images form a set of adjacent images. In some embodiments, operation 202 is performed by an image component the same as or similar to image component 22 (shown in FIG. 16 and described herein).

At an operation 204, interpolated images between adjacent images are determined. In some embodiments, operation 204 is performed by an up-sampling component the same as or similar to up-sampling component 23 (shown in FIG. 16 and described herein).

At an operation 206, a stereoscopic panorama is determined based on obtained images and interpolated images. In some embodiments, operation 206 is performed by a stitching component the same as or similar to stitching component 24 (shown in FIG. 16 and described herein).

The present invention, in accordance with one or more various implementations, is described above in detail with reference to the accompanying figures. The drawings are provided for purposes of illustration only and merely depict exemplary implementations. These drawings are provided to facilitate the reader's understanding of the systems and methods described herein and shall not be considered limiting of the breadth, scope, or applicability of any of the claims.

Although the systems and methods set forth herein are described in terms of various exemplary implementations and implementations, it should be understood that the various features, aspects and functionality described in one or more of the individual implementations are not limited in their applicability to the particular implementation with which they are described, but instead can be applied, alone or in various combinations, to one or more of the other implementations, whether or not such implementations are described and whether or not such features are presented as being a part of a described implementation. Thus, the breadth and scope of the present disclosure should not be limited by any of the above-described exemplary implementations.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

Additionally, the various implementations set forth herein are described in terms of exemplary block diagrams, flow charts, and/or other illustrations. As will become apparent to one of ordinary skill in the art after reading this document, the illustrated implementations and their various alternatives can be implemented without confinement to the illustrated examples. For example, block diagrams and their accompanying description should not be construed as mandating a particular architecture or configuration.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation. It is to be understood that the present technology contemplates that one or more features of any claim can be dependent on and/or combined with one or more features of any other claim.

What is claimed is:

1. A system configured to generate stereoscopic panoramas, the system comprising:
   one or more physical processors configured by machine-readable instructions to:
      obtain a set of images based on captured images, wherein at least some of the captured images form a set of adjacent images, wherein the obtained set of images are based on re-projected images, the re-projected images being determined by:
         determining compensated images by compensating for perspective distortion caused by a shape of a lens of a camera used to capture the captured images;
         determining orientation-corrected images based on the compensated images by compensating for one or both of a non-circular camera trajectory and/or a non-parallel principal axis used during image capture; and
         determining the re-projected images based on the orientation-corrected images by re-projecting orientation-corrected images onto a cylindrical imaging surface and reducing vertical parallax;

determine interpolated images between adjacent images in the obtained set of images by determining flow fields between related pixels in adjacent images in the obtained set of images; and determine a stereoscopic panorama based on the obtained set of images and interpolated images determined from the obtained set of images.

2. The system of claim 1, wherein the one or more physical processors are further configured by machine-readable instructions to determine the flow fields by compensating for transformations of pixel grids for the obtained images.

3. The system of claim 1, wherein the one or more physical processors are further configured by machine-readable instructions to determine the stereoscopic panorama based on determining vertical strips of the obtained images and further based on blending the vertical strips, wherein blending is based on the determined flow fields.

4. The system of claim 1, wherein the obtained images are based on aligned images, and wherein the one or more physical processors are further configured by machine-readable instructions to:

determine the aligned images based on alignment of the re-projected images and/or vertical fragments/strips thereof by projecting the re-projected images into a planar two-dimensional surface such that rotational and/or positional drift between adjacent images is reduced, wherein alignment is based on structure-from-motion.

5. The system of claim 4, wherein alignment causes a transformation of pixel grids of the aligned images, and wherein the one or more physical processors are further configured by machine-readable instructions to determine the flow fields by compensating for the transformation.

6. The system of claim 1, further comprising physical storage media configured to store the captured images.

7. The system of claim 6, further comprising a camera configured to capture images, wherein the camera is configured to be carried and/or supported by the support structure, wherein a viewing direction of the camera is either tangential or orthogonal to the circular path.

8. The system of claim 1, further comprising a support structure configured to carry and/or support a camera, wherein the support structure is configured to move along a circular path such that the camera is moved along the circular path.

9. A computer-implemented method for generating stereoscopic panoramas, the method being implemented in a computer system that includes one or more physical processors and physical storage media storing machine-readable instructions, the method comprising:

obtaining a set of images based on captured images, wherein at least some of the captured images form a set of adjacent images, wherein the obtained set of images are based on re-projected images, the re-projected images being determined by:

determining compensated images by compensating for perspective distortion caused by a shape of a lens of a camera used to capture the captured images;

determining orientation-corrected images based on the compensated images by compensating for one or both of a non-circular camera trajectory and/or a non-parallel principal axis used during image capture; and determining the re-projected images based on the orientation-corrected images by re-projecting orientation-corrected images onto a cylindrical imaging surface and reducing vertical parallax;

determining interpolated images between adjacent images in the obtained set of images by determining flow fields between related pixels in adjacent images in the obtained set of images; and determining a stereoscopic panorama based on the obtained set of images and interpolated images determined from the obtained set of images.

10. The computer-implemented method of claim 9, wherein determining the flow fields includes compensating for transformations of pixel grids for the obtained images.

11. The computer-implemented method of claim 9, wherein determining the stereoscopic panorama is based on determining vertical strips of the obtained images and further based on blending the vertical strips, wherein blending is based on the determined flow fields.

12. The computer-implemented method of claim 9, wherein the obtained images are based on aligned images, the method further comprising:

determining the aligned images based on alignment of the re-projected images and/or vertical fragments/strips thereof, wherein the alignment is accomplished by projecting the re-projected images into a planar two-dimensional surface such that one or both of rotational and/or positional drift between adjacent images is reduced.

13. The computer-implemented method of claim 12, wherein the alignment causes a transformation of pixel grids of the aligned images, and wherein determining the flow fields is accomplished by compensating for the transformation caused by the alignment.

14. The computer-implemented method of claim 8, further comprising:

capturing images, by a camera, wherein a viewing direction of the camera is either tangential or orthogonal to a circular path, and wherein the obtained images are based on the images captured by the camera.

* * * * *